United States Patent
Park et al.

(10) Patent No.: US 9,998,941 B2
(45) Date of Patent: Jun. 12, 2018

(54) MOBILE TERMINAL AND ELECTRONIC DEVICE

(71) Applicant: LG ELECTRONICS INC, Seoul (KR)

(72) Inventors: Sangduck Park, Seoul (KR); Hakrae Lee, Seoul (KR); Jaehoon Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/260,958

(22) Filed: Sep. 9, 2016

(65) Prior Publication Data
US 2017/0078906 A1  Mar. 16, 2017

(30) Foreign Application Priority Data
Sep. 11, 2015  (KR) ........................ 10-2015-0129286

(51) Int. Cl.
| | |
|---|---|
| *H04B 17/00* | (2015.01) |
| *H04W 24/10* | (2009.01) |
| *H04W 24/08* | (2009.01) |
| *H04M 1/725* | (2006.01) |
| *H04L 12/26* | (2006.01) |
| *H04L 12/24* | (2006.01) |
| *H04L 12/28* | (2006.01) |

(52) U.S. Cl.
CPC ......... *H04W 24/10* (2013.01); *H04L 12/2803* (2013.01); *H04L 41/069* (2013.01); *H04L 43/065* (2013.01); *H04L 43/0817* (2013.01); *H04M 1/72522* (2013.01); *H04W 24/08* (2013.01)

(58) Field of Classification Search
CPC .. H04W 24/10; H04W 24/08; H04L 12/2803; H04L 41/069; H04L 43/065; H04L 43/0817; H04M 1/72522
See application file for complete search history.

(56) References Cited

U.S. PATENT DOCUMENTS

| | | | | |
|---|---|---|---|---|
| 5,331,616 A | * | 7/1994 | Morita ................. | G11B 15/026 360/31 |
| 2009/0319927 A1 | * | 12/2009 | Beeman ................ | G06F 17/24 715/764 |
| 2011/0054844 A1 | * | 3/2011 | Han ..................... | H04L 12/2825 702/185 |

(Continued)

FOREIGN PATENT DOCUMENTS

| | | | |
|---|---|---|---|
| EP | 2846105 A1 | 3/2015 | |
| KR | 10-2014-0039640 A | 4/2014 | |

(Continued)

*Primary Examiner* — Nguyen Vo
(74) *Attorney, Agent, or Firm* — Dentons US LLP

(57) ABSTRACT

A mobile terminal includes a communication unit, a display, and a controller for performing a control operation to display a screen related to an electronic device, performing a control operation to request for diagnostic data based on an input for a diagnosis mode provided with the screen related to the electronic device, to display a screen of the diagnostic data, and performing a control operation to request for detailed diagnostic data based on an input for a detailed diagnosis mode, and to display a screen of detailed diagnostic data. Thus, the diagnostic data or detailed diagnostic data about the electronic device may be easily displayed.

9 Claims, 21 Drawing Sheets

(56) References Cited

U.S. PATENT DOCUMENTS

| | | | | |
|---|---|---|---|---|
| 2013/0179819 A1* | 7/2013 | Jung | ............... | G06F 3/0482 |
| | | | | 715/771 |
| 2014/0087661 A1* | 3/2014 | Kim | ............... | H04B 5/0025 |
| | | | | 455/41.1 |
| 2014/0300447 A1* | 10/2014 | Ha | ............... | H04Q 9/00 |
| | | | | 340/5.61 |
| 2015/0081103 A1* | 3/2015 | Song | ............... | F24F 11/006 |
| | | | | 700/275 |

FOREIGN PATENT DOCUMENTS

| | | |
|---|---|---|
| KR | 10-2014-0122107 A | 10/2014 |
| KR | 1020150022255 A | 3/2015 |

\* cited by examiner

MOBILE TERMINAL AND ELECTRONIC DEVICE

CROSS-REFERENCE TO RELATED APPLICATION

This application claims the priority benefit of Korean Patent Application No. 10-2015-0129286, filed on Sep. 11, 2015 in the Korean Intellectual Property Office, the disclosure of which is incorporated herein by reference.

BACKGROUND

1. Field of the Disclosure

The present disclosure relates to a mobile terminal and an electronic device and, more particularly, to a mobile terminal capable of easily displaying diagnostic data or detailed diagnostic data for an electronic device, and an electronic device.

2. Background

Electronic devices such as home appliances are disposed in a dwelling to perform corresponding operations.

With development of various communication schemes, various methods to enhance user convenience through communication have been studied for electronic devices such as home appliances. Particularly, research has been conducted on a method for easily implementing diagnosis of malfunctions of electric devices such as home appliances.

SUMMARY

One object is to provide a mobile terminal capable of easily displaying diagnostic data or detailed diagnostic data about an electronic device, and an electronic device.

In accordance with one aspect, the above and other objects may be accomplished by the provision of a mobile terminal mobile including a communication unit, a display, and a controller to perform a control operation to display on the display a screen related to an electronic device, to perform a control operation to request for diagnostic data based on an input for a diagnosis mode provided with the screen related to the electronic device, to display on the display a screen of the diagnostic data, and to perform a control operation to request for detailed diagnostic data based on an input for a detailed diagnosis mode, and to display on the display a screen of the detailed diagnostic data.

In accordance with another aspect, there is provided an electronic device including a memory, a communication unit, and a controller to perform a control operation when an error occurs during operation of the electronic device, the controller to store, in the memory, diagnostic data containing error occurrence time information, operation information at a time of occurrence of the error, and status information, to perform a control operation to retrieve the diagnostic data from the memory when a request for the diagnostic data is received by the communication unit, to transmit the diagnostic data to the mobile terminal, and to perform a control operation to retrieve detailed diagnostic data stored in the memory when a request for the detailed diagnostic data is received by the communication unit, and to transmit the detailed diagnostic data to the mobile terminal.

BRIEF DESCRIPTION OF THE DRAWINGS

The above and other objects, features and other advantages will be more clearly understood from the following detailed description taken in conjunction with the accompanying drawings, in which:

FIGS. 7A and 7B to 14 are views illustrating the operation methods of FIG. 6;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably. The "module" and "unit" are electrical and/or mechanical structures that are well known to those skilled in the art unless described with certain details in the description. Further, "controller" may be a microprocessor, electrical logic circuits, or electrical circuits designed to control certain module or unit, etc.

An electronic device 100 according to an embodiment of the present invention may be a laundry treating appliance, an air conditioner, a refrigerator, a water purifier, a cleaner, a TV, a vehicle, a robot, a drone, or the like.

Figure 1:
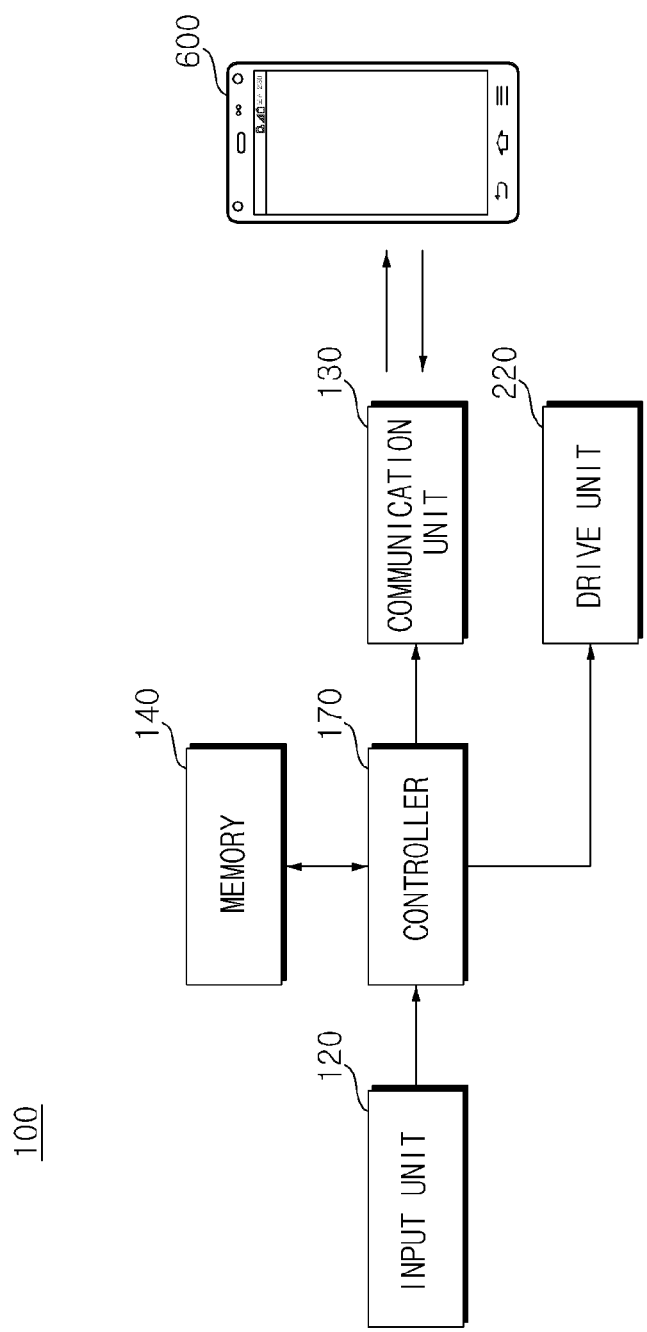
FIG. 1 is an internal block diagram illustrating an electronic device according to an embodiment of the present invention.

FIG. 1 is an internal block diagram illustrating an electronic device according to an embodiment of the present invention.

The electronic device 100 may include an input unit 120, a communication unit 130, a memory 140, a controller 170, and a drive unit 220.

The input unit 120 may include a manipulation button and a key, and output an input signal for power on/off power and operation setting.

The communication unit 130 may exchange data with a surrounding device, for example, a remote controller or a mobile terminal 600 by wire or wirelessly. For example, the communication unit 113 may perform infrared (IR) communication, radio frequency (RF) communication, Bluetooth communication, ZigBee communication, Wi-Fi communication, and the like.

A controller 670 (see FIG. 5) may perform a control operation to display an electronic device-related screen based on a user input. If there is an input for a diagnosis mode with the electronic device-related screen displayed, the controller 670 may perform a control operation to display a diagnostic data screen. If there is an input for a detailed diagnosis mode, the controller 670 may perform a control operation to display a detailed diagnostic data screen. Thereby, the diagnostic data or the detailed diagnostic data about an electronic device may be easily displayed.

The mobile terminal 600 and the electronic device 100 may perform communication either by wire or wirelessly.

For example, a communication unit 610 (see FIG. 5) of the mobile terminal 600 and the communication unit 130 of the electronic device 100 may perform communication in various manners including ZigBee communication, Wi-Fi communication, Bluetooth communication, and IR communication.

The memory 140 of the electronic device 100 may store data necessary for operation of the electronic device 100. For example, the memory 140 may store data such as the operation time and the operation mode of the drive unit 220.

The controller 170 may control respective units in the electronic device 100. For example, the controller 170 may control the input unit 120, the communication unit 130, the memory 140, and the drive unit 220.

According to an embodiment of the present invention, when an error occurs during operation of the electronic device 100, the memory 140 in the electronic device 100 may store diagnostic data including error occurrence time information, information about an operation at the time of error occurrence, and status information.

Particularly, the memory 140 may temporarily store the operation information and the status information periodically. When an error occurs, the memory 140 may store final operation information and final status information of periodically stored temporary operation information and status information.

When an error occurs, the memory 140 may store operation information at the time of error occurrence. The memory 140 may also store operation information or status information after a predetermined time passes from the time of error occurrence.

When an error occurs during operation of the electronic device 100, the controller 170 of the electronic device 100 may control the memory 140 store diagnostic data including error occurrence time information, operation information at the time of error occurrence, and status information. If the communication unit 130 receives a request for the diagnostic data, the controller 170 may perform a control operation to transmit the diagnostic data to the mobile terminal. If the communication unit 130 receives a request for detailed diagnostic data, the controller 170 may perform a control operation to transmit the detailed diagnostic data to the mobile terminal 600. Thereby, the diagnostic data or detailed diagnostic data may be easily transmitted to the mobile terminal 600.

Herein, the diagnostic data and the detailed diagnostic data may include operation information, status information, operation information at the time of error occurrence, or operation information or status information after a predetermined time from the time of error occurrence, which is periodically stored.

The detailed diagnostic data may be specific data of the diagnostic data.

For example, the diagnostic data may include temperature information, compressor discharge temperature information, outdoor fan speed information, indoor fan operation mode information, and error occurrence information.

The detailed diagnostic data may contain an operation mode of the compressor, a target frequency of the inverter, a present frequency, a target frequency of a fan, a present frequency of the fan, a single-phase input voltage, an input current, an input power frequency, a target DC-link voltage, and a compressor phase current.

The drive unit 220 may drive the motor of the electronic device 100.

A motor driving apparatus described in this specification may be an apparatus which is not provided with a position sensor such as a Hall sensor for sensing the position of the rotor of a motor, but is capable of estimating the position of the rotor of the motor in a sensorless manner. Hereinafter, a sensorless motor driving apparatus will be described.

The motor drive unit 220 according to an embodiment of the present invention may be referred to as a motor driving apparatus 220.

Figure 2:
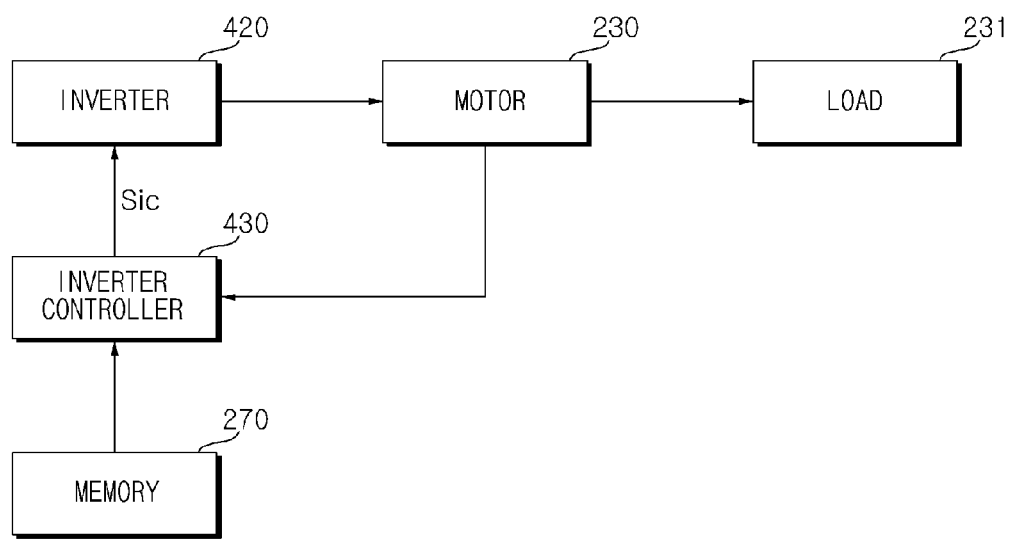
FIG. 2 is an internal block diagram illustrating the motor driving apparatus of FIG. 1.
Figure 3:
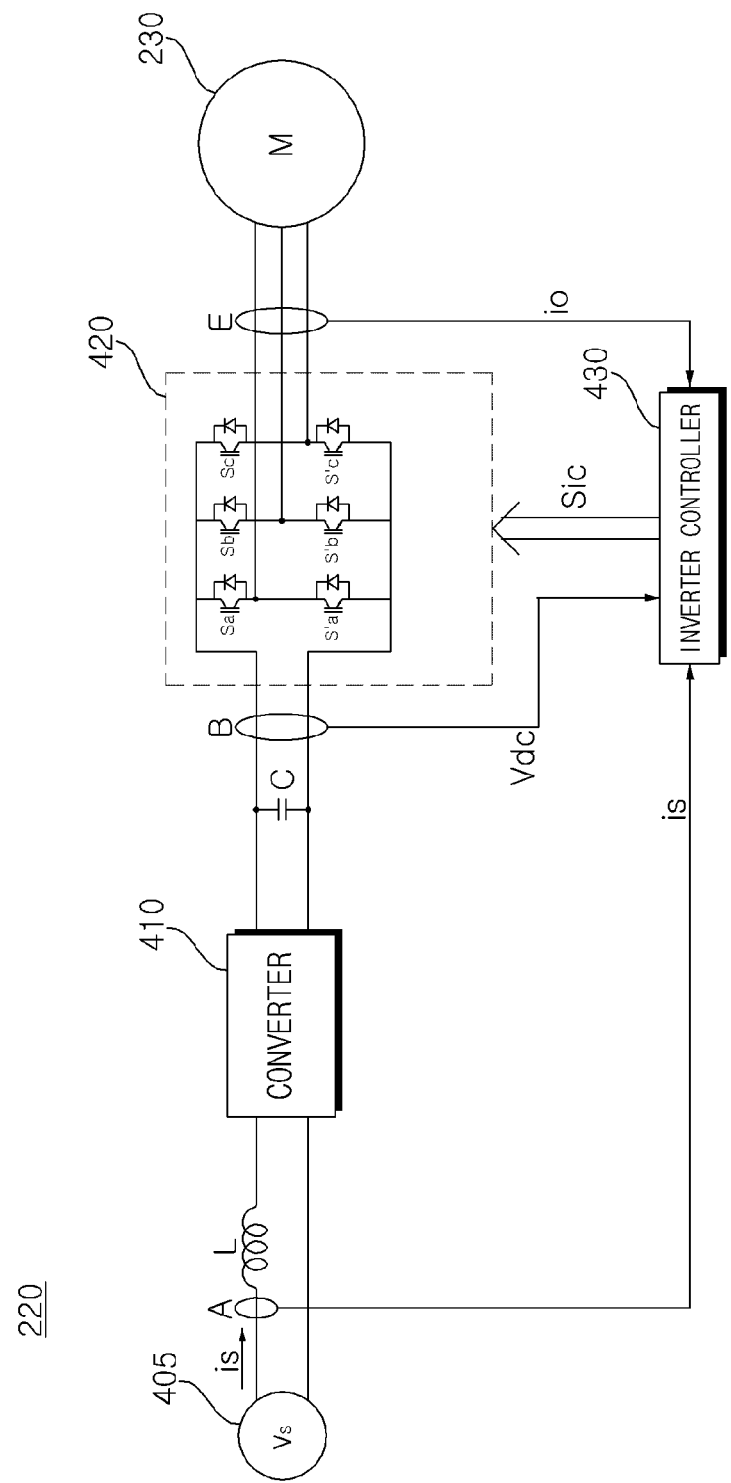
FIG. 3 is an internal circuit diagram illustrating the motor driving apparatus of FIG. 2.

FIG. 2 is an internal block diagram illustrating the motor driving apparatus of FIG. 1, and FIG. 3 is an internal circuit diagram illustrating the motor driving apparatus of FIG. 2.

Referring to FIGS. 1 and 2, the motor driving apparatus 220, which is configured to drive a motor in a sensorless manner, may include an inverter 420 and an inverter controller 430.

The motor driving apparatus 220 may also include a converter 410, a DC link voltage detector B, a smoothing capacitor C, and an output current detector E. The drive unit 220 may further include an input current detector A and a reactor L.

When an error occurs during operation of the electronic device, the inverter controller 430 may control the memory 140 or the memory 270 to store diagnostic data including error occurrence time information, operation information at the time of error occurrence, and status information.

The inverter controller 430 may control the memory 140 or the memory 270 to temporarily store operation information and status information periodically. When an error occurs, the inverter controller 430 may control the memory 140 or the memory 270 to store final operation information and final status information of periodically stored temporary operation information and status information.

When an error occurs, the inverter controller 430 may control the memory 140 or the memory 270 to store operation information at the time of error occurrence, and may control the memory 140 or the memory 270 to store operation information or status information after a predetermined time from the time of error occurrence.

Preferably, the data amount of the final operation information and final status information stored in the memory 140 or the memory 270 is larger than the data amount of the operation information or status information after the predetermined time from the time of error occurrence.

Hereinafter, operations of constituent units in the motor driving apparatus 220 of FIGS. 2 and 3 will be described.

The reactor L is disposed between a commercial AC power source 405 ($v_s$) and the converter 410 to perform power factor correction or voltage boost. The reactor L may also function to restrict a harmonic current according to high-speed switching of the converter 410.

The input current detector A may detect input current is that is inputted from the commercial AC power source 405.

To this end, a current transformer (CT) or a shunt resistor may be used as the input current detector A. The detected input current is, which is a discrete signal in the form of a pulse, may be inputted to the inverter controller 430.

The converter 410 converts the commercial AC power 405 applied via the reactor L into DC power and output the DC power. While the commercial AC power 405 is illustrated as a single-phase AC power, 3-phase AC power may be employed as the commercial AC power 405. The internal structure of the converter 410 depends on the type of the commercial AC power source 405.

The converter 410 may be configured by diodes without the switching device. In this case, the converter 410 may perform the rectification operation without performing a separate switching operation.

For example, when the applied power is single-phase AC power, 4 diodes may be used in the form of a bridge. When the applied power is 3-phase AC power, 6 diodes may be used in the form of a bridge.

As the converter 410, a half-bridge converter formed by connecting, for example, 2 switching devices and 4 diodes may be used. When 3-phase AC power is employed, 6 switching devices and 6 diodes may be used.

When the converter 410 is provided with switching devices, the converter 410 may perform voltage boost, power factor improvement, and DC power conversion according to the switching operation of the switching devices.

The smoothing capacitor C smooths and stores input power. While the figure illustrates that one smoothing capacitor C is used, a plurality of smoothing capacitors may be provided to secure device stability.

While the smoothing capacitor C is illustrated as being connected to the output terminal of the converter 410, embodiments of the present invention are not limited thereto. DC power may be directly applied to the smoothing capacitor C. For example, DC power from a solar cell may be directly inputted to the smoothing capacitor C or inputted to the smoothing capacitor C via DC-DC conversion. Hereinafter, description will be given based on details shown in the figures.

As DC power is stored in the smoothing capacitor C, both ends of the smoothing capacitor C may be referred to as DC ends or DC link ends.

The DC link voltage detector B may detect a DC link voltage Vdc between both ends of the smoothing capacitor C. To this end, the DC link voltage detector B may include a resistor device and an amplifier. The detected DC link voltage Vdc may be inputted to the inverter controller 430 as a discrete signal in the form of a pulse.

The inverter 420 may be provided with a plurality of inverter switching devices. Thereby, the inverter 420 may convert the rectified DC power Vdc into 3-phase AC powers va, vb, and vc of predetermined frequencies according to turning on/off of the switching devices and output the converted powers to a 3-phase synchronous motor 230.

The inverter 420 includes upper switching devices Sa, Sb and Sc and lower switching devices S'a, S'b and S'c. Each of the upper switching devices Sa, Sb, Sc and a corresponding lower switching device S'a, S'b, S'c are connected in series to form a pair. Three pairs of upper and lower switching devices Sa and S'a, Sb and S'b, and Sc and S'c are connected in parallel. Each of the switching devices Sa, S'a, Sb, S'b, Sc and S'c is connected with a diode in an antiparallel manner.

Each of the switching devices in the inverter 420 is turned on/off based on an inverter switching control signal Sic from the inverter controller 430. Thereby, 3-phase AC power having a predetermined frequency is outputted to the 3-phase synchronous motor 230.

The inverter controller 430 may control the switching operation of the inverter 420 in a sensorless manner. To this end, the inverter controller 430 may receive an output current $i_o$ detected by the output current detector E.

In order to control the switching operation of the inverter 420, the inverter controller 430 outputs the inverter switching control signal Sic to the inverter 420. The inverter switching control signal Sic is a pulse width modulated (PWM) switching control signal. The inverter switching control signal Sic is generated and outputted based on the output current $i_o$ detected by the output current detector E. The operation of outputting the inverter switching control signal Sic from the inverter controller 430 will be described in detail with reference to FIG. 3 later in this specification.

The output current detector E detects the output current $i_O$ flowing between the inverter 420 and the 3-phase motor 230. That is, the output current detector E detects current flowing to the motor 230. The output current detector E may detect all output currents ia, ib and ic of the respective phases, or may detect output currents of two phases using 3-phase smoothing.

The output current detector E may be positioned between the inverter 420 and the motor 230, and may employ a current transformer (CT), a shunt resistor, or the like to detect currents.

In using shunt resistors, three shunt resistors may be positioned between the inverter 420 and the synchronous motor 230, or ends of the shunt resistors may be connected to the three lower switching devices S'a, S'b and S'c of the inverter 420. It is also possible to use two shunt resistors based on 3-phase smoothing. When a single shunt resistor is employed, the shunt resistor may be disposed between the capacitor C and the inverter 420.

The detected output current $i_o$ may be a discrete signal in the form of a pulse and applied to the inverter controller 430. The inverter switching control signal Sic is generated based on the detected output current $i_o$. In the following description, the output current $i_o$ may be illustrated as including 3-phase output currents ia, ib and ic.

The 3-phase motor 230 includes a stator and a rotor. The rotor rotates when AC current of a phase of a predetermined frequency is applied to a coil of a corresponding phase (of a, b and c phases) of the stator.

The motor 230 may include, for example, a Surface-Mounted Permanent-Magnet Synchronous Motor (SMPMSM), an Interior Permanent Magnet Synchronous Motor (IPMSM), and a Synchronous Reluctance Motor (SynRM). The SMPMSM and the IPMSM are Permanent Magnet Synchronous Motors (PMSM) employing permanent magnets, while the SynRM does not have a permanent magnet.

Figure 4:
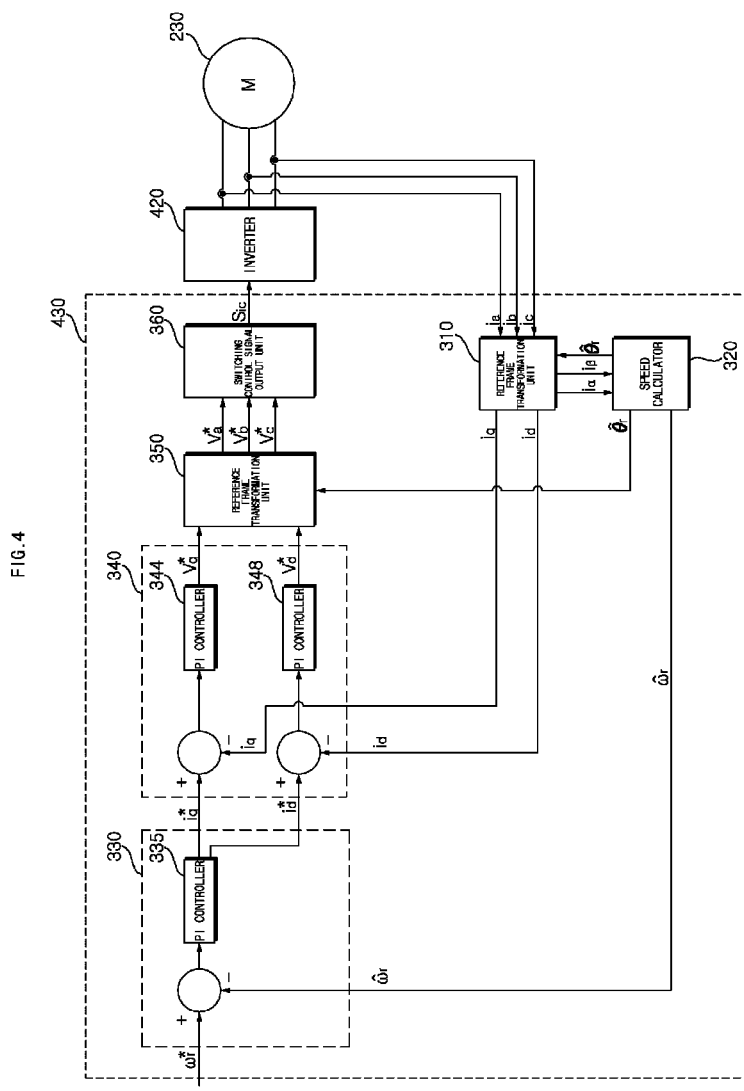
FIG. 4 is an internal block diagram illustrating the inverter controller of FIG. 3.

FIG. 4 is an internal block diagram illustrating an inverter controller of FIG. 3.

Referring to FIG. 4, the inverter controller 430 may include a reference frame transformation unit 310, a speed calculator 320, a current command generator 330, a voltage command generator 340, a reference frame transformation unit 350, and a switching control signal output unit 360.

The reference frame transformation unit 310 receives the 3-phase output currents (ia, ib, ic) detected by the output current detector E, and transforms the same into 2-phase currents (iα, iβ) in a stationary reference frame.

The reference frame transformation unit 310 may transform 2-phase currents (iα, iβ) in the stationary reference frame to 2-phase currents (id, iq) in a rotating coding system.

The speed calculator 320 may output a position $\hat{\theta}_r$ and a speed $\hat{\omega}_r$ calculated based on the 2 phase currents (iα, iβ) of the stationary reference frame that are frame-transformed by the reference frame transformation unit 310.

The current command generator 330 generates a current command value $i^*_q$ based on the calculated speed $\hat{\omega}_r$ and a speed command value $\omega^*_r$. For example, the current command generator 330 may perform PI control in a PI controller 335 and generate the current command value $i^*_r$ based on the difference between the calculated speed $\hat{\omega}_r$ and the speed command value $\omega^*_r$. While FIG. 4 illustrates a q-axis current command value $i^*_q$ as a current command value, a d-axis current command value $i^*_d$ may also be generated. The d-axis current command value $i^*_d$ may be set to 0.

The current command generator 330 may further include a limiter (not shown) for limiting the level of the current command value $i^*_q$ such that the current command value $i^*_q$ does not exceed an allowable range.

Next, the voltage command generator 340 generates d-axis and q-axis voltage command values $v^*_d$ and $v^*_q$ based on the d-axis and q-axis currents $i_d$ and $i_q$ which are transformed into currents in the 2-phase rotating reference frame by the reference frame transformation unit and the current command values $i^*_d$ and $i^*_q$ from the current command generator 330. For example, the voltage command generator 340 may perform PI control in a PI controller 344 and generate a q-axis voltage command value $v^*_q$ based on the difference between the q-axis current $i_q$ and the q-axis current command value $i^*_q$. In addition, the voltage command generator 340 may perform PI control in a PI controller 348 and generate the d-axis voltage command value $v^*_d$ based on the difference between the d-axis current $i_d$ and the d-axis current command value $i^*_d$. The voltage command generator 340 may further include a limiter (not shown) for limiting the levels of the d-axis and q-axis voltage command values $v^*_d$ and $v^*_q$ such that the d-axis and q-axis voltage command values $v^*_d$ and $v^*_q$ do not exceed an allowable range.

The generated d-axis and q-axis voltage command values $v^*_d$ and $v^*_q$ are inputted to the reference frame transformation unit 350.

The reference frame transformation unit 350 receives the position $\hat{\theta}_r$ by the speed calculator 320 and the d-axis and q-axis voltage command values $v^*_d$ and $v^*_q$ and performs reference frame transformation.

The reference frame transformation unit 350 transforms a 2-phase rotating reference frame into a 2-phase stationary reference frame. The transformation may be performed using the position $\hat{\theta}_r$ calculated by the speed calculator 320.

The reference frame transformation unit 350 may also transform the 2-phase stationary reference frame into a 3-phase stationary reference frame. Through such transformation, the reference frame transformation unit 350 outputs 3-phase output voltage command values v*a, v*b, and v*c.

The switching control signal output unit 360 outputs a PWM inverter switching control signal Sic based on the 3-phase output voltage command values v*a, v*b, and v*c.

The output inverter switching control signal Sic is transformed into a gate drive signal in a gate drive unit (not shown) and then inputted to the gate of each switching device in the inverter 420. Thereby, the switching devices Sa, S'a, Sb, S'b, Sc, and S'c in the inverter 420 perform the switching operation.

Figure 5:
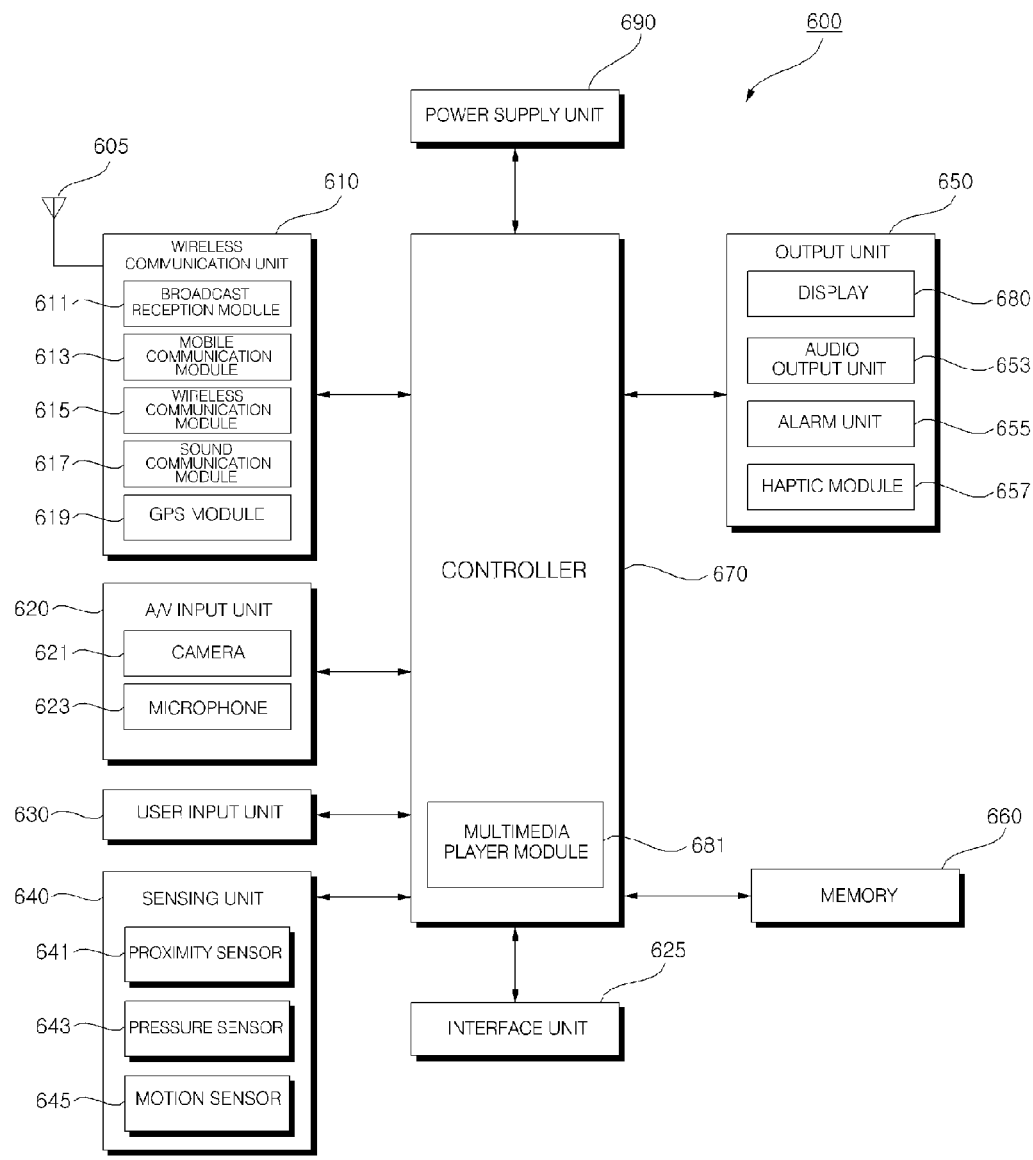
FIG. 5 is an internal block diagram illustrating the mobile terminal of FIG. 1.

FIG. 5 is an internal block diagram illustrating the mobile terminal of FIG. 1.

Referring to FIG. 5, the mobile terminal 600 may include the wireless communication unit 610, an A/V (Audio/Video) input unit 620, a user input unit 630, a sensing unit 640, an output unit 650, a memory 660, an interface unit 625, a controller 670, and a power supply 690.

The wireless communication unit 610 may include a broadcast reception module 611, a mobile communication module 613, a wireless Internet module 615, a sound communication unit 617, and a GPS module 619.

The broadcast reception module 611 may receive at least one of a broadcast signal and broadcast-related information from an external broadcast management server over a broadcast channel. The broadcast channel may include a satellite channel and a terrestrial channel.

The broadcast signal and/or the broadcast-related information received through the broadcast reception module 611 may be stored in the memory 660.

The mobile communication module 613 transmits and receives a radio signal to and from at least one of a base station, an external terminal and a server over a mobile communication network. Herein, the radio signal may contain various kinds of data according to transmission and reception of a voice call signal, a video call signal, or a text/multimedia message.

The wireless Internet module 615 refers to a module for wireless Internet access. The wireless Internet module 615 may be installed inside or outside the mobile terminal 600. For example, the wireless Internet module 615 may perform Wi-Fi-based wireless communication or Wi-Fi Direct-based wireless communication.

The sound communication unit 617 may perform sound communication. The sound communication unit 617 may output sound by adding predetermined information data to audio data to be outputted in a sound communication mode. In addition, the sound communication unit 617 may extract predetermined information data from a received sound in the sound communication mode.

Additionally, as short-range communication technology, for example, Bluetooth, Radio Frequency Identification (RFID), infrared Data Association (IrDA), Ultra Wideband (UWB), and ZigBee may be employed.

The Global Position System (GPS) module 619 may receive position information from a plurality of GPS satellites.

The A/V (Audio/Video) input unit 620, which is used to input audio signal or a video signal, may include a camera 621 and a microphone 623.

The user input unit 630 generates key input data which is inputted by the user to control operation of the terminal. To this end, the user input unit 630 may be configured by a keypad, a dome switch, a touchpad (resistive touchpad/capacitive touchpad), and the like. Particularly, when the touchpad and a display 680 construct a layered structure, the structure may be referred to as a touchscreen.

The sensing unit 640 may sense present states of the mobile terminal 600 such as the opened or closed state of the mobile terminal 600, the position of the mobile terminal 600 and presence of a user contact, and generate a sensing signal for controlling operation of the mobile terminal 600.

The sensing unit 640 may include a proximity sensor 641, a pressure sensor 643, and a motion sensor 645. The motion sensor 645 may sense movement or a position of the mobile terminal 600 using an acceleration sensor, a gyro sensor, a gravity sensor, and the like. For instance, the gyro sensor, which serves to measure an angular speed, may sense an oriented direction (angle) with respect to a reference direction.

The output unit 650 may include the display 680, an audio output unit 653, an alarm unit 655, and a haptic module 657.

The display 680 displays and outputs information processed by the mobile terminal 600.

When the display 680 and a touchpad constructs a layered structure to form a touchscreen as described above, the display 680 may be used not only as an output device but also as an input device through which information can be inputted according to a user touch.

The audio output unit 653 outputs audio data received from the wireless communication unit 610 or stored in the memory 660. The audio output unit 653 may include a speaker and a buzzer.

The alarm unit 655 outputs a signal for alarming occurrence of an event on the mobile terminal 600. For example, the signal may be outputted in the form of vibration.

The haptic module 657 generates various haptic effects which can be felt by the user. A typical example of the haptic effects generated by the haptic module 657 is vibration.

The memory 660 may store a program for processing and controlling operations of the controller 670, or perform a function of temporarily storing data (e.g., a phonebook, a message, a still image, a moving image, etc.) which is inputted or outputted.

The interface unit 625 serves as an interface between the mobile terminal 600 and all external devices connected thereto. The interface unit 625 may receive data from the external devices or applied power and deliver the same to internal constituents of the mobile terminal 600. The interface unit 625 may also allow data in the mobile terminal 600 to be transmitted to external devices.

Usually, the controller 670 controls operation of each unit described above and also controls overall operations of the mobile terminal 600. For example, the controller 670 may perform relevant control and processing of a voice call, data communication and a video call. The controller 670 may include a multimedia reproduction module 681 for reproducing multimedia. The multimedia reproduction module 681 may be configured in the controller 670 as hardware, or configured as software separate from the controller 670 and executed by the controller.

External power or internal power is applied to the power supply 690 under control of the controller 670, and the power supply 690 supplies power necessary for operations of the respective constituents.

The block diagram of the mobile terminal 600 shown in FIG. 5 is a block diagram for an embodiment of the present invention. Each constituent in the block diagram may be integrated, added or omitted according to the specification of the mobile terminal 600 which is actually realized. That is, two or more constituents may be combined to form one constituent, or one constituent may be divided into two or more constituents. In addition, functions performed by the respective blocks are simply illustrative, and the specific operations or devices thereof do not limit the scope of the present invention.

Figure 6:
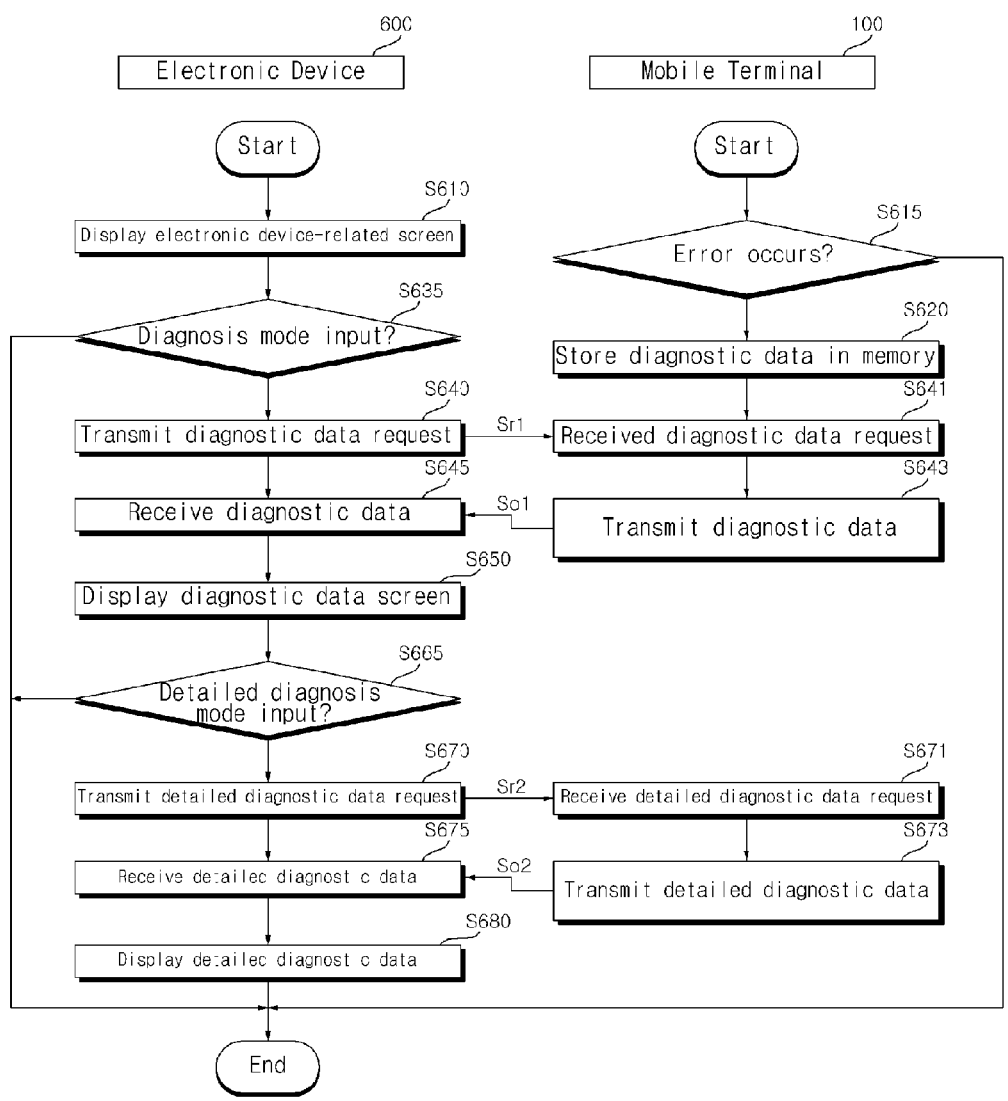
FIG. 6 is a flowchart illustrating a method for operating a mobile terminal and an electronic device according to an embodiment of the present invention.

FIG. 6 is a flowchart illustrating a method for operating a mobile terminal and an electronic device according to an embodiment of the present invention, and FIGS. 7 to 14 are views explaining the method of FIG. 6.

Referring to FIG. 6, the controller 670 of the mobile terminal 600 performs a control operation to display an electronic device-related screen based on a user input (S610).

For example, when an application for control of an electronic device installed in the mobile terminal 600 is executed, the controller 670 of the mobile terminal 600 may perform a control operation to display an electronic device-related screen.

Alternatively, when a pairing signal or a pairing response signal is received from the electronic device 100 through the communication unit 610, the controller 670 of the mobile terminal 600 may perform a control operation to display a screen related to the electronic device according to a user input or automatically after completing pairing with the electronic device.

Next, when an input for the diagnosis mode is provided with the electronic device-related screen displayed (S635), the controller 670 of the mobile terminal 600 may control the communication unit 610 to transmit a diagnostic data request Sr1 (S640).

If an error occurs (S615), the controller 170 of the electronic device 100 may perform a control operation, separately from the operation of the mobile terminal 600, to store diagnostic data and/or detailed diagnostic data in the memory 140 (S620).

Herein, the diagnostic data and detailed diagnostic data may include periodically stored operation information or status information, operation information at the time of error occurrence, and operation information or status information after a predetermined time from the time of error occurrence.

The detailed diagnostic data may be diagnostic data which is more specific than the diagnostic data.

For example, the diagnostic data may include temperature information, compressor discharge temperature information, outdoor fan speed information, indoor fan operation mode information, and error occurrence information.

The detailed diagnostic data may include an operation mode of the compressor, a target frequency of the inverter, a present frequency, a target frequency of a fan, the present frequency of a fan, a single-phase input voltage, an input current, an input power frequency, a target DC-link voltage, and a phase current of the compressor.

The controller 170 of the electronic device 100 may receive a diagnostic data request Sr1 from the mobile terminal 600 through the communication unit 130 (S641).

Then, the controller 170 of the electronic device 100 may perform a control operation to retrieve and transmit the diagnostic data stored in the memory 140 to the mobile terminal 600 (S643).

Thereby, the controller 670 of the mobile terminal 600 may receive the diagnostic data through the communication unit 610 (S645).

Then, the controller 670 of the mobile terminal 600 may perform a control operation to display a diagnostic data screen based on the received diagnostic data (S650). Thereby, the diagnostic data about the electronic device may be easily displayed.

Meanwhile, when an input for the detailed diagnosis mode is provided with the electronic device-related screen or the diagnostic data screen displayed, (S665), the controller 670 of the mobile terminal 600 may control the communication unit 610 to transmit a detailed diagnostic data request Sr2 (S670).

The controller 170 of the electronic device 100 may receive the detailed diagnostic data request Sr2 from the mobile terminal 600 through the communication unit 130 (S671).

Then, the controller 170 of the electronic device 100 may perform a control operation to retrieve and transmit the detailed diagnostic data stored in the memory 140 to the mobile terminal 600 (S673).

Thereby, the controller 670 of the mobile terminal 600 may receive the detailed diagnostic data through the communication unit 610 (S675).

Then, the controller 670 of the mobile terminal 600 may perform a control operation to display a detailed diagnostic data screen based on the received detailed diagnostic data (S680). Thereby, the detailed diagnostic data may be easily displayed.

Figure 7A:
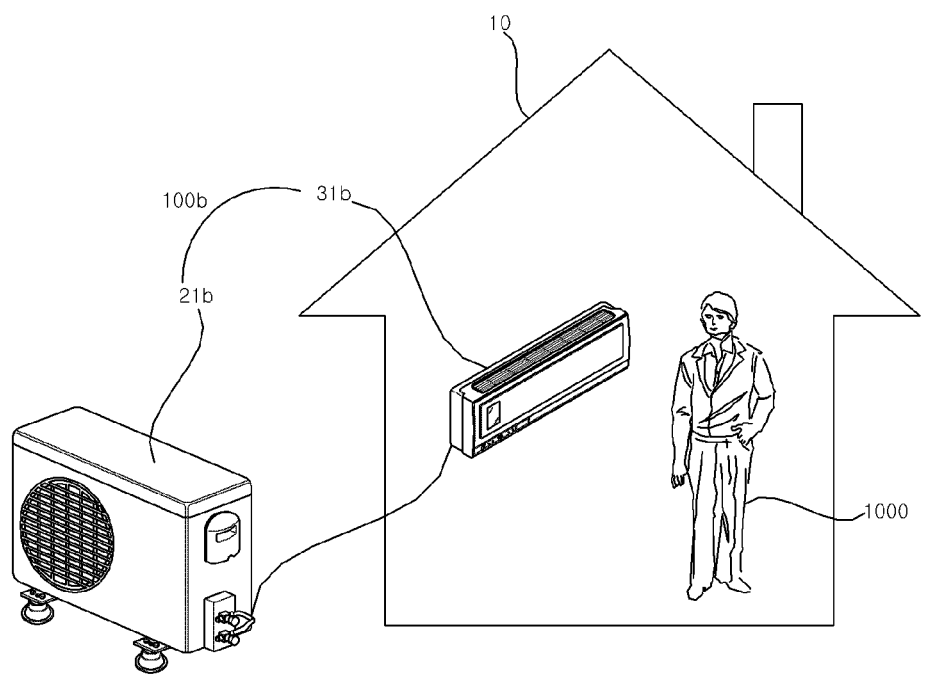

FIG. 7A illustrates an air conditioner 100b including an indoor unit 31b and an outdoor unit 21b as an exemplary electronic device.

Various methods to secure diagnostic data about error occurrence during operation of an electronic device such as the air conditioner 100b are under discussion.

According to an embodiment of the present invention, to secure diagnostic data about error occurrence during operation of the electronic device, a mobile terminal exchanges data with the electronic device. For instance, diagnostic data and detailed diagnostic data are distinguished from each other through an application of the mobile terminal and received from the electronic device, and a corresponding diagnostic data screen and a corresponding detailed diagnostic data screen are displayed on the mobile terminal 600 of a user 1000.

Figure 7B:
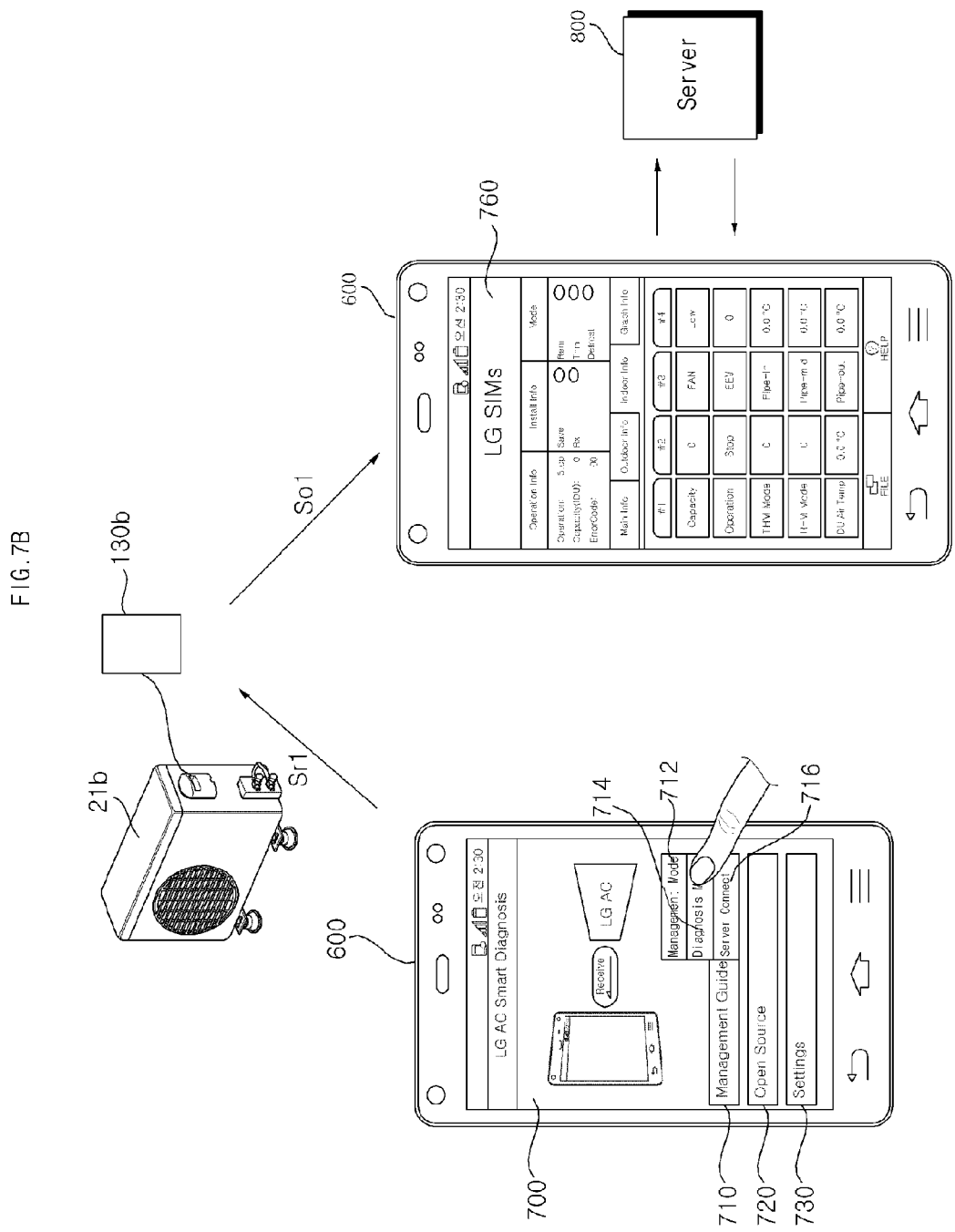

FIG. 7B illustrates exchange of data between a communication unit 130b attached to the outdoor unit 21b and the mobile terminal 600 of the user 1000.

For instance, when an application for control of the electronic device installed in the mobile terminal 600 is executed, the controller 670 of the mobile terminal 600 may perform a control operation to display an electronic device-related screen 700, as shown in FIG. 7B.

The electronic device-related screen 700 may include a management item 710, a source item 720, and a setting item 730.

If the management item 710 is selected, the controller 670 of the mobile terminal 600 may perform a control operation to display a management mode item 712, a diagnosis mode item 714 and a server connection item 716 in a pop-up manner, as shown in FIG. 7B.

When the diagnosis mode item 714 is selected, the controller 670 of the mobile terminal 600 may transmit a diagnostic data request Sr1 to the communication unit 130b attached to the outdoor unit 21b, as shown in FIG. 7B.

As the diagnostic data request Sr1 is received, a controller 170b in the outdoor unit 21b may perform a control operation to transmit diagnostic data So1 including operation information and status information about the outdoor unit 21b and the indoor unit 31b which is stored in a memory.

Thereby, the communication unit 130b of the outdoor unit 21b may transmit the diagnostic data So1 to the mobile terminal 600.

The controller 670 of the mobile terminal 600 may receive the diagnostic data So1 about the air conditioner 100b through the communication unit 610, and may perform a control operation to display a diagnostic data screen 760 based on the received diagnostic data So1 about the air conditioner 100b.

The diagnostic data screen 760 may include outdoor unit temperature information, compressor discharge temperature information, outdoor fan speed information, indoor fan operation mode information, and error occurrence information about the air conditioner.

The controller 670 of the mobile terminal 600 may autonomously perform a smart diagnosis based on the received diagnostic data So1. For example, when the indoor unit 31b suffers fan malfunction, the controller 670 may determine the fan malfunction based on the received diagnostic data So1.

Alternatively, the controller 670 of the mobile terminal 600 may perform a control operation to transmit the received diagnostic data So1 to a server 800 to implement the smart diagnosis.

Thereafter, when the controller 670 of the mobile terminal 600 receives a diagnostic result from the server 800 or autonomously determines a diagnostic result, the controller 670 of the mobile terminal 600 may perform a control operation to display the diagnostic result information on the display 680. Thereby, the diagnostic result based on the diagnostic data may be easily confirmed.

Figure 8:
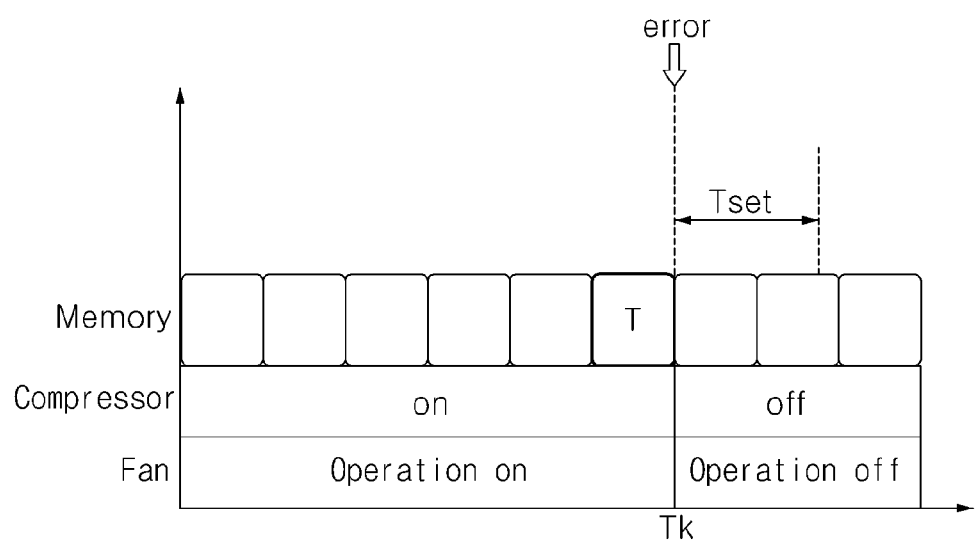

FIG. 8 is a diagram illustrating operation of a compressor and the memory 140 performed when an error occurs in the air conditioner 100b.

Referring to FIG. 8, once an error occurs, the memory 140 needs to have a settling period of Tset. After the error occurs, operations of the compressor 102b and the indoor fan 109ab (see FIG. 18) performed before occurrence of the error is temporarily suspended.

Figure 9:
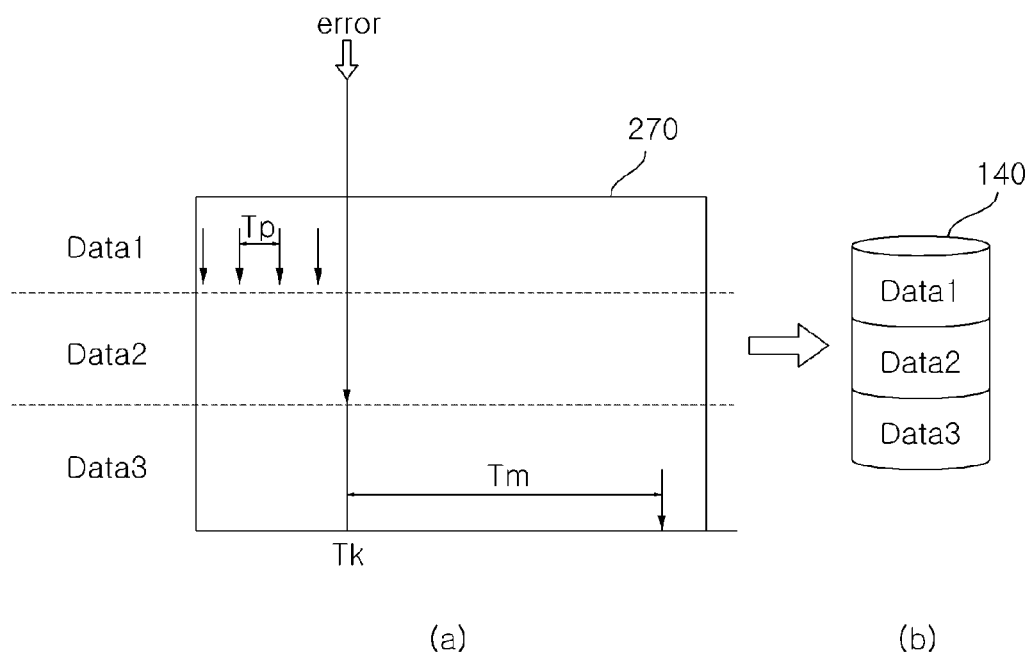

FIG. 9 is a diagram illustrating storing timing of the response information which is stored in, for example the memory 140 when an error occurs as in FIG. 8.

For example, the memory 140 or the memory 270 in the motor driving apparatus 220 may temporarily store operation information and status information, which correspond to periodic data Data1, periodically.

When an error occurs at the time Tk, the memory 140 or the memory 270 in the motor driving apparatus 220 may store final operation information and final status information of periodically stored temporary operation information and status information.

When an error occurs (at Tk), the memory 140 or the memory 270 in the motor driving apparatus 220 may store operation information given at the time of error occurrence as instantaneous data Data2.

Meanwhile, the memory 140 or the memory 270 in the motor driving apparatus 220 may store, in the memory 140, operation information or status information given after a predetermined time Tm from the time of error occurrence Tk as post-occurrence data Data3.

The data amount of the final operation information or the final status information stored in the memory 140 or the memory 270 in the motor driving apparatus 220 may be larger than the data amount of the operation information given at the time of error occurrence or the data amount of the operation information or status information given after a predetermined time from the time of error.

For example, the periodic data Data1 may have a first data volume and contain information about, for example, temperature, pressure, an environment, a voltage, and a current.

The instantaneous data Data2 may have a second data volume smaller than the first data volume and contain information about, for example, a voltage, the peak current value and a speed at the time of error occurrence.

The post-occurrence data Data3 may have a third data volume smaller than the first data volume and contain an inverter fault maintenance time and error history information.

The controller 170 may perform a control operation such that the periodic data Data1, the instantaneous data Data2 and the post-occurrence data Data3 stored in the memory 270 of the motor driving apparatus 220 is moved to and stored in the memory 140 after a predetermined time.

That is, the controller 170 may perform a control operation such that the data stored in the memory 270 of the motor driving apparatus 220 is periodically moved to and stored in the memory 140.

Figure 10:
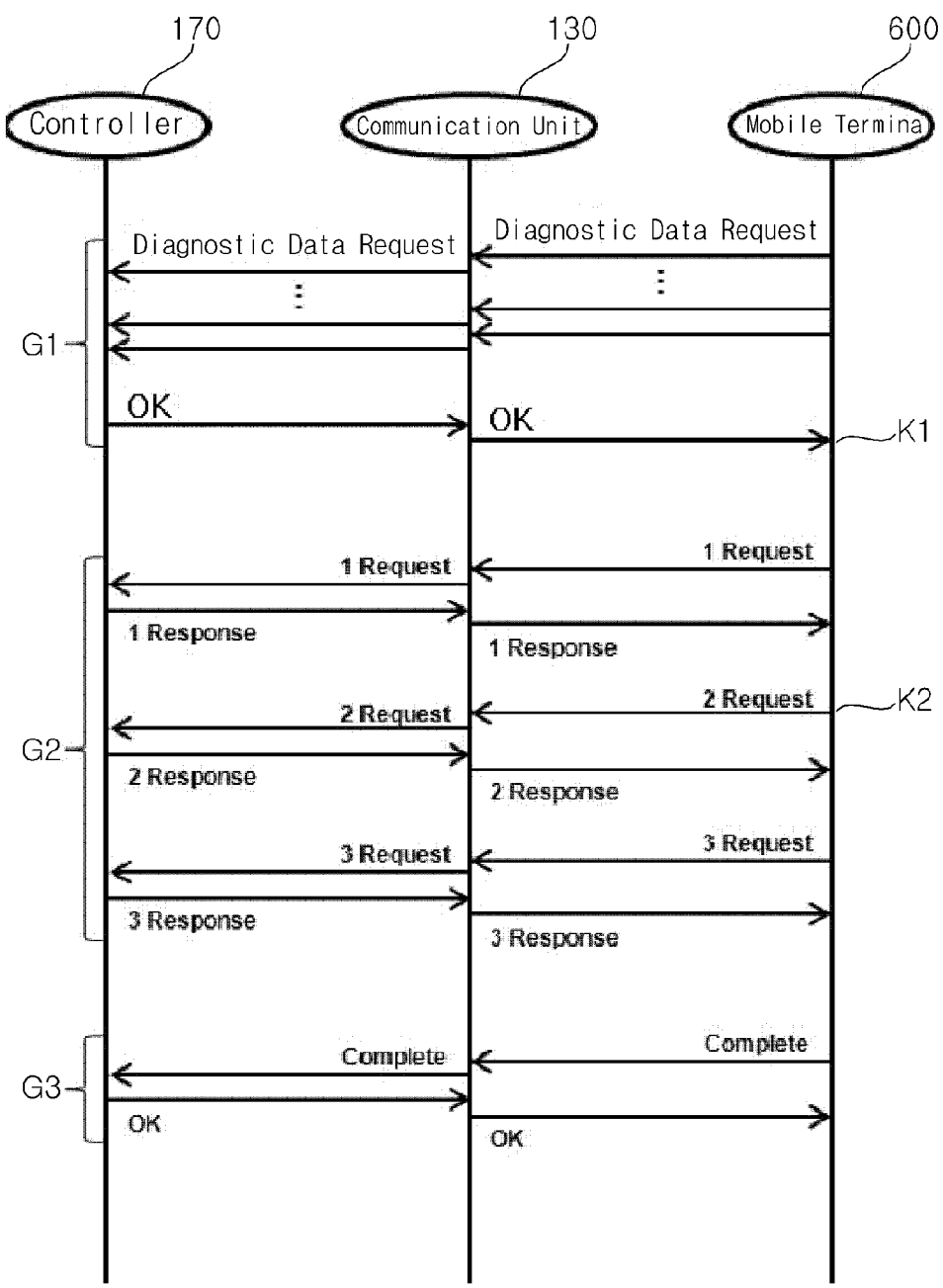

FIG. 10 is a signal flow illustrating flow of signals among the mobile terminal 600, the communication unit 130 of the electronic device and the controller 170 of the electronic device.

Referring to FIG. 10, the mobile terminal 600 may transmit a diagnostic data request to the communication unit 130 in the electronic device 100. The diagnostic data request transmitted to the communication unit 130 in the electronic device 100 may be delivered to the controller 170 of the electronic device 100.

When the diagnostic data request is received at least a predetermined number of times, for example, 3 times, the controller 170 of the electronic device 100 may perform a control operation such that an acknowledgment message K1 is transmitted to the mobile terminal 600. That is, as shown in FIG. 10, the controller 170 of the electronic device 100 may transmit the acknowledgment message K1 to the communication unit 130, and the communication unit 130 may in turn transmit the acknowledgment message K1 to the mobile terminal 600 (G1).

Meanwhile, the controller 670 of the mobile terminal 600 may transmit a diagnostic data request to the electronic device 100, and receive diagnostic data from the electronic device 100.

If the diagnostic data is not received after the controller 670 of the mobile terminal 600 transmits the diagnostic data request to the electronic device 100, the controller 670 may transmit a diagnostic data re-request K2 to the communication unit 130 in the electronic device 100 (G2).

After receiving the diagnostic data, the controller 670 of the mobile terminal 600 may transmit a diagnostic data request completion message to the communication unit 130 in the electronic device 100. The diagnostic data request completion message transmitted to the communication unit 130 in the electronic device 100 may be delivered to the controller 170 of the electronic device 100.

Then, the controller 170 of the electronic device 100 may perform a control operation such that a completion confirmation message is transmitted to the mobile terminal 600 (G3).

Figure 11:
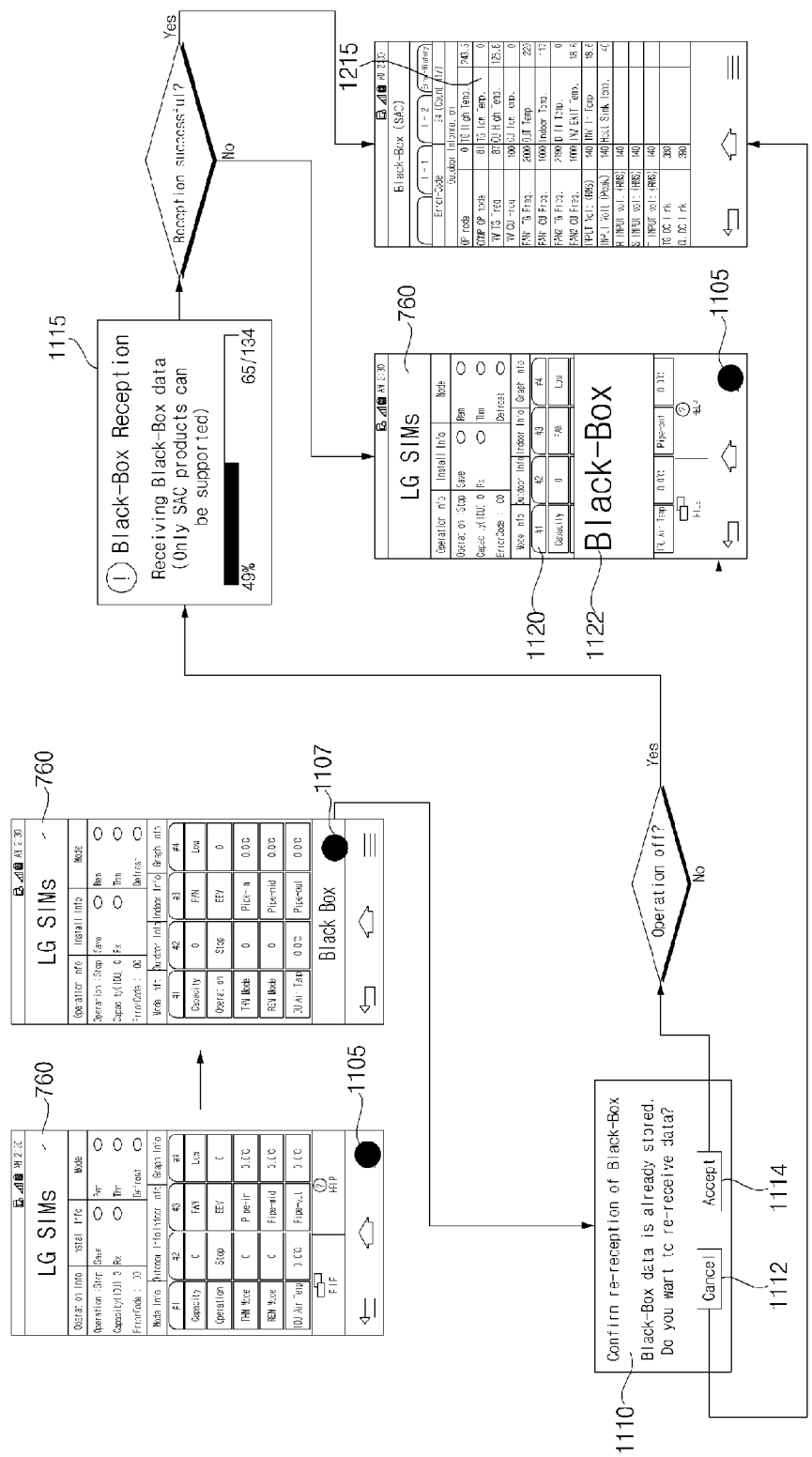

FIG. 11 illustrates the diagnostic data screen 760 according to reception of the diagnostic data.

If the electronic device is an air conditioner, the diagnostic data screen 760 may contain outdoor unit temperature information, compressor discharge temperature information, outdoor fan speed information, indoor fan operation mode information and error occurrence information about the air conditioner.

If a detailed view item 1105 is selected with the diagnostic data screen 760 displayed, the controller 670 of the mobile terminal 600 may perform a control operation such that a detailed diagnostic data item 1107 is displayed at the bottom of the screen, as shown in FIG. 11.

If a detailed diagnostic data item 1107 is selected with the diagnostic data screen 760 displayed, the controller 670 of the mobile terminal 600 may perform a control operation such that an object 1110 indicating whether or not to update pre-stored detailed diagnostic data is displayed.

The object 1110 may include a Confirm item 1114 for updating and a Cancel item 1112 for canceling updating.

When the Confirm item 1114 for updating is selected in the object 1110, the controller 670 of the mobile terminal 600 determines whether the electronic device 100 is currently operating or working.

If the electronic device 100 is currently operating or working without error, the controller 670 of the mobile terminal 600 may perform a control operation such that a detailed diagnostic data reception failure message 1122 is displayed, as shown in FIG. 11. The detailed diagnostic data reception failure message 1122 could indicate that there is no detailed diagnostic data or the reception of the detailed diagnostic data failed.

The detailed diagnostic data reception failure message 1122 may be displayed on a deactivated diagnostic data screen 1120 as shown in FIG. 11.

If the electronic device 100 is not operating or working, the controller 670 of the mobile terminal 600 may perform a control operation such that a detailed diagnostic data request is transmitted to the electronic device 100.

When the detailed diagnostic data is being received from the electronic device 100, the controller 670 of the mobile terminal 600 may perform a control operation to display an object 1115 indicating that the detailed diagnostic data is being received from the electronic device 100.

Once reception of the detailed diagnostic data is completed, the controller 670 of the mobile terminal 600 may perform a control operation to display a detailed diagnostic data screen 1215 based on the received detailed diagnostic data.

If reception of the detailed diagnostic data fails, the controller 670 of the mobile terminal 600 may perform a control operation to display a detailed diagnostic data reception failure message and a message 1122 indicating a detailed diagnostic data re-request, as shown in FIG. 11.

Thereby, the controller 670 of the mobile terminal 600 may perform a control operation to transmit the detailed diagnostic data re-request to the electronic device 100.

Figure 12:
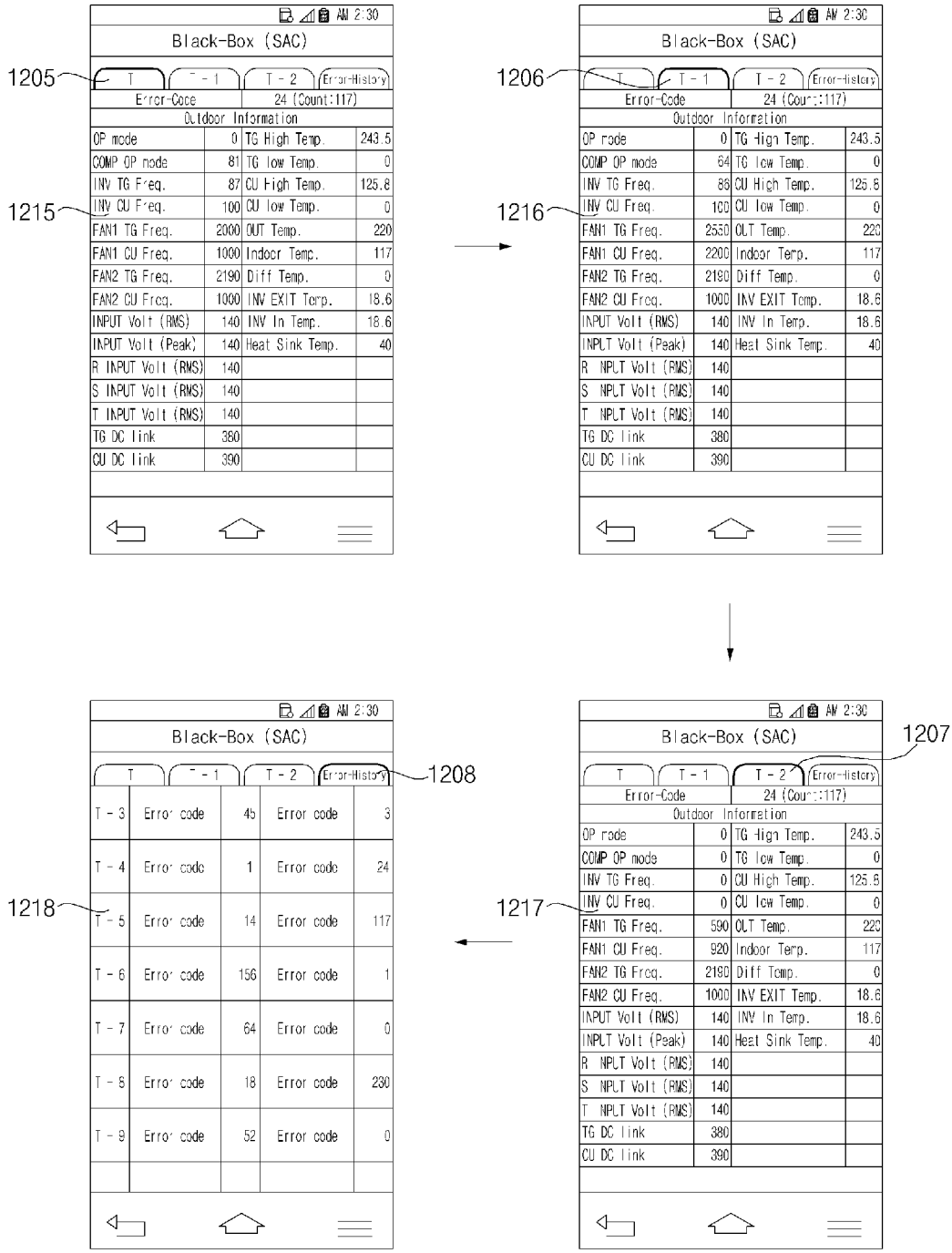
Figure 13:
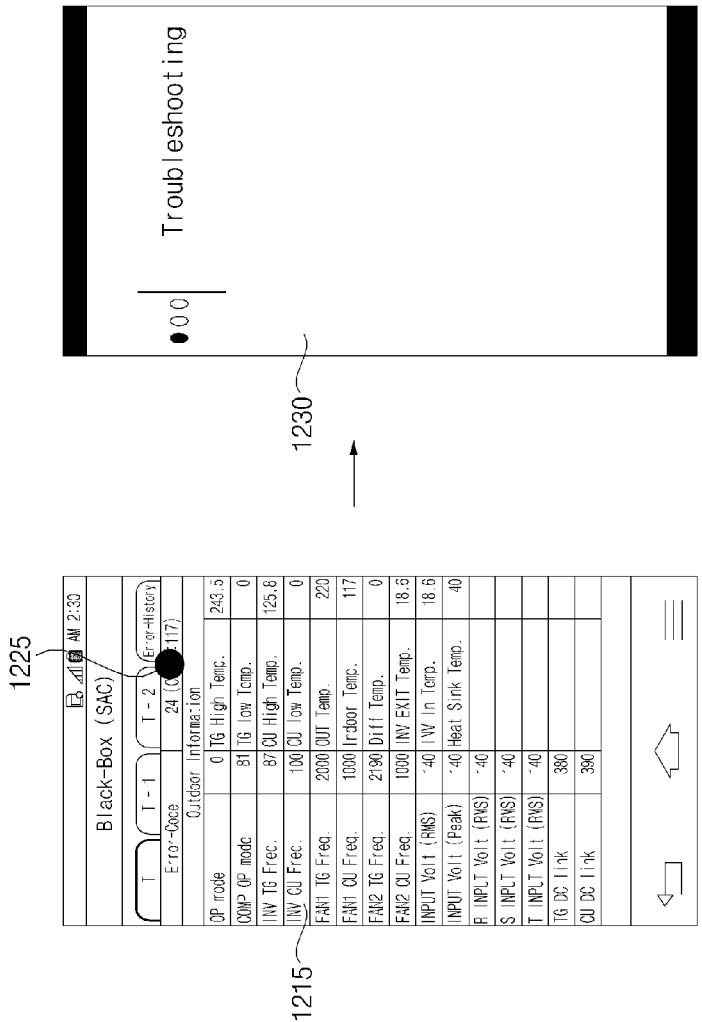
Figure 14:
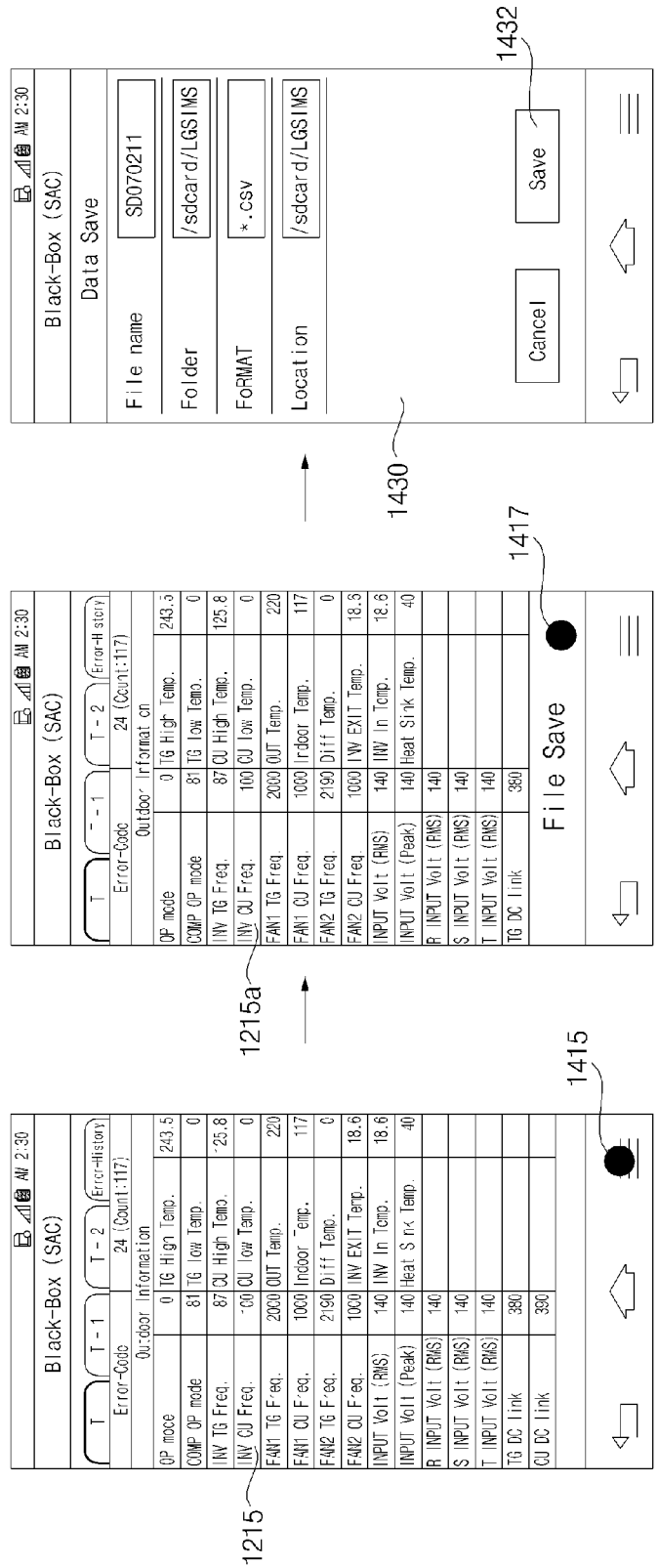

FIGS. 12 to 14 illustrate various examples of the detailed diagnostic data screen.

Referring to FIG. 12, the detailed diagnostic data screen 1215 may be displayed according to time as described below.

The detailed diagnostic data screen 1215 may include error code information, detailed diagnostic data corresponding to each error time, and error history information.

The controller 670 of the mobile terminal 600 may perform a control operation to distinctively display the detailed diagnostic data screen according to each error time. For instance, the controller 670 may perform a control operation such that a tab menu for displaying a diagnostic data screen corresponding to each error time is displayed.

When a tab menu corresponding to a first time item 1205 is selected, the controller 670 of the mobile terminal 600 may perform a control operation to display the detailed diagnostic data screen 1215 corresponding to the first time, as shown in FIG. 12.

For instance, the detailed diagnostic data screen 1215 corresponding to the first time may contain detailed diagnostic data corresponding to the first time, i.e., an operation mode of the compressor, a target frequency of the inverter, and a present frequency, a target frequency of a fan, a present frequency of the fan, a single-phase input voltage, an input voltage, an input power frequency, a target DC-link voltage, the present DC-link voltage, and a compressor phase current.

When a tab menu corresponding to a second time item 1206 is selected, the controller 670 of the mobile terminal

600 may perform a control operation to display a detailed diagnostic data screen 1216 corresponding to the second time, as shown in FIG. 12.

When a tab menu corresponding to a third time item 1207 is selected, the controller 670 of the mobile terminal 600 may perform a control operation to display a detailed diagnostic data screen 1217 corresponding to the third time, as shown in FIG. 12.

When a tab menu corresponding to an error history item 1208 is selected, the controller 670 of the mobile terminal 600 may perform a control operation to display an error history information screen 1218, as shown in FIG. 12.

Referring to FIG. 13, when error code information 1225 is selected with the detailed diagnostic data screen 1215 displayed, the controller 670 of the mobile terminal 600 may perform a control operation such that a waiting screen 1230 is displayed first and then a screen 1240 is displayed in which items corresponding to the selected error code information are highlighted among a plurality of items in the detailed diagnostic data screen.

For example, if error codes corresponding to respective times are different from each other, different sets of items among the detailed diagnostic items may be highlighted and displayed.

When a Save input for the detailed diagnostic data screen 1215 is provided with the detailed diagnostic data screen 1215 displayed, the controller 670 of the mobile terminal 600 may perform a control operation to display a data save screen for setting a filename and a location in which the file will be saved.

Referring to FIG. 14, when a detailed view item 1415 is selected with the detailed diagnostic data screen 1215 displayed, the controller 670 of the mobile terminal 600 may perform a control operation to display a File Save item 1417 on a part of the screen.

Then, if the File Save item 1417 is selected, the controller 670 of the mobile terminal 600 may perform a control operation to display a file save screen 1430 containing a filename input field for inputting a filename, a folder name input field for inputting a folder name and a format input field for inputting a format, as shown in FIG. 14.

Then, if a File Save item 1432 is selected on the file save screen 1430, the controller 670 of the mobile terminal 600 may perform a control operation to save a file related to the detailed diagnostic data screen in the set filename and the set format in the save location that is inputted. Thereby, the user may save the detailed diagnostic data screen in the desired location.

Meanwhile, the operation method for the diagnostic data or the detailed diagnostic data between the mobile terminal 600 and electronic device 100 described above is applicable to various electronic devices. For example, the method is applicable to a laundry treating appliance, an air conditioner, a refrigerator, a water purifier, a cleaner, a TV, a vehicle, a robot, a drone, and the like.

Figure 15:
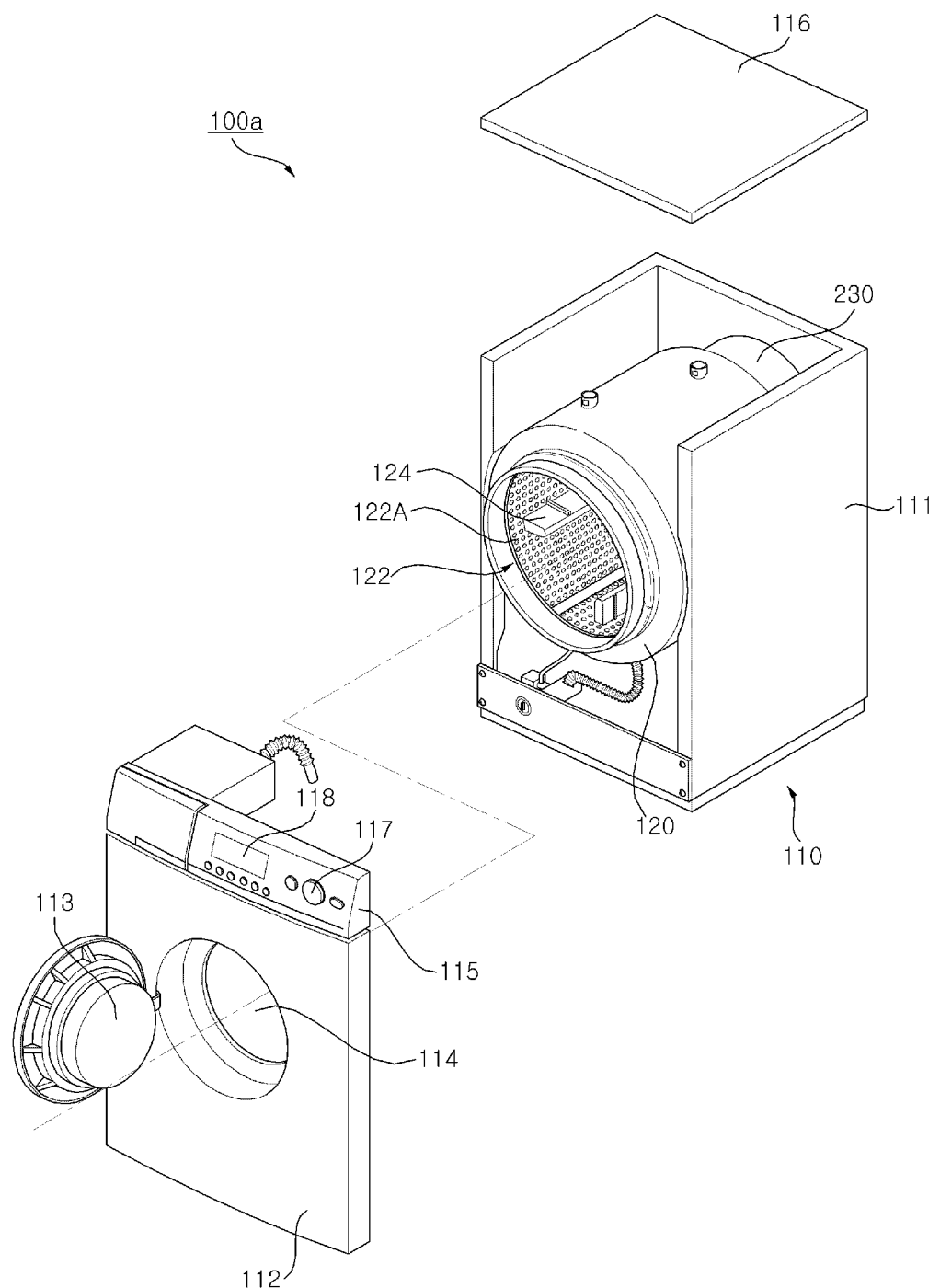
FIG. 15 is a perspective view illustrating a laundry treating appliance which is an exemplary electronic device according to an embodiment of the present invention.

FIG. 15 is a perspective view illustrating a laundry treating appliance which is an exemplary electronic device according to an embodiment of the present invention.

Referring to FIG. 15, a laundry treating appliance 100a is a front-loading laundry treating appliance wherein laundry is inserted from the front into a washtub. The front-loading laundry treating appliance conceptually includes a washing machine for performing the operations of washing, rinsing and drying of inserted laundry or a dryer for drying inserted wet laundry. Hereinafter, description will be given focusing on the washing machine.

The laundry treating appliance 100a of FIG. 15, which is a washtub-based laundry treating appliance, includes a cabinet 110 defining the exterior of the laundry treating appliance 100a, a tub 120 disposed inside the cabinet 110 and supported by the cabinet 110, a washtub 122 which is disposed inside the tub 120 and in which laundry is washed, a motor 230 for driving the washtub 122, and a wash water supplier (not shown) disposed outside a cabinet body 111 to supply wash water into the cabinet 110, and a drainage unit (not shown) formed on the lower side of the tub 120 to discharge wash water outward.

The washtub 122 is provided with a plurality of through holes 122A allowing wash water to pass therethrough. A lifter 124 may be disposed on the inner surface of the washtub 122 to lift the laundry to a certain height during rotation such that the laundry drops due to gravity.

The cabinet 110 includes the cabinet body 111, a cabinet cover 112 disposed on and connected to the front surface of the cabinet body 111, a control panel 115 disposed on the upper side of the cabinet cover 112 and connected to the cabinet body 111, and a top plate 116 disposed on the upper side of the control panel 115 and connected to the cabinet body 111.

The cabinet cover 112 includes a laundry introduction hole 114 formed to allow introduction and retrieval of laundry therethrough and a door 113 disposed to be horizontally rotatable to open and close the laundry introduction hole 114.

The control panel 115 includes manipulation keys 117 for controlling the operation status of the laundry treating appliance 100a and a display 118 disposed on one side of the manipulation keys 117 to display the operation status of the laundry treating appliance 100a.

The manipulation keys 117 and the display 118 in the control panel 115 are electrically connected to a controller (not shown). The controller (not shown) electrically controls respective constituents of the laundry treating appliance 100a. Operation of the controller (not shown) will be described later.

The washtub 122 may be provided with an auto-balancer (not shown). The auto-balancer (not shown), which serves to attenuate vibration caused by uneven distribution of laundry contained in the washtub 122, may be implemented by, for example, a liquid balancer or a ball balancer.

Although not shown in FIG. 15, the laundry treating appliance 100a may further include a vibration sensor for measuring the degree of vibration of the washtub 122 or the cabinet 110.

Figure 16:
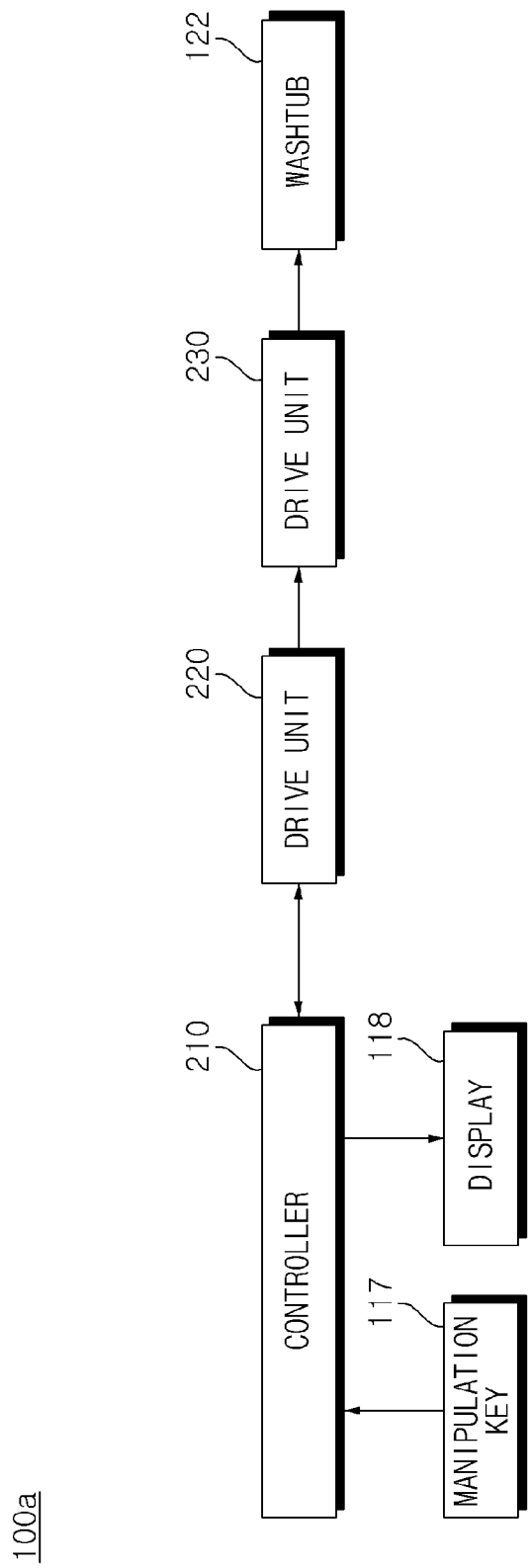
FIG. 16 is an internal block diagram illustrating the laundry treating appliance of FIG. 15.

FIG. 16 is an internal block diagram of the laundry treating appliance of FIG. 15.

Referring to FIG. 16, in the laundry treating appliance 100a, the drive unit 220 is controlled by a controller 210. The drive unit 220 drives the motor 230. Thereby, the washtub 122 is rotated by the motor 230.

The controller 210 operates according to an operation signal received from the manipulation key 117. Thereby, washing, rinsing, and drying may be performed.

In addition, the controller 210 may control the display 118 to display a washing mode, a washing time, a drying time, a rinsing time, or the current operation status.

The controller 210 controls the drive unit 220 to operate the motor 230. In this case, a position sensor for sensing the position of the rotor of the motor 230 is not provided to the interior or exterior of the motor 230. That is, the drive unit 220 controls the motor 230 in a sensorless manner.

The drive unit 220, which serves to drive the motor 230, may include an inverter (not shown), an inverter controller (not shown), an output current detector E (see FIG. 2) for detecting an output current flowing through the motor 230, and an output voltage detector F (see FIG. 2) for detecting an output voltage vo applied to the motor 230. The drive unit 220 may conceptually further include a converter for supplying DC power to be input to the inverter (not shown).

For example, the inverter controller 430 (see FIG. 2) estimates the position of the rotor of the motor 230 based on an output current io and the output voltage vo. Then, the drive unit 220 controls the motor 230 based on the estimated position of the rotor such that the motor 230 rotates.

When the inverter controller 430 (see FIG. 2) generates a PWM switching control signal Sic (see FIG. 2) based on the output current io and the output voltage vo and outputs the same to the inverter (not shown), the inverter (not shown) supplies AC power of a predetermined frequency to the motor 230. Then, the motor 230 is caused to rotate by the AC power of the predetermined frequency.

The drive unit 220 may correspond to the motor driving apparatus 220 of FIG. 1.

The controller 210 may sense the amount of laundry based on, for example, the output current io flowing through the motor 230. For example, while the washtub 122 is rotating, the controller 210 may sense the amount of laundry based on the current value io of the motor 230.

The controller 210 may accurately sense the amount of laundry using the rotor resistance and inductance of the motor measured in a motor alignment interval.

The controller 210 may sense the degree of uneven distribution of the washtub 122, i.e., unbalance (UB) of the washtub 122. Sensing the degree of uneven distribution may be performed based on a ripple component of the output current io flowing through the motor 230 or the amount of change in the rate of rotation of the washtub 122.

The controller 210 may accurately sense the amount of laundry using the rotor resistance and inductance of the motor measured in a motor alignment interval.

Figure 17:
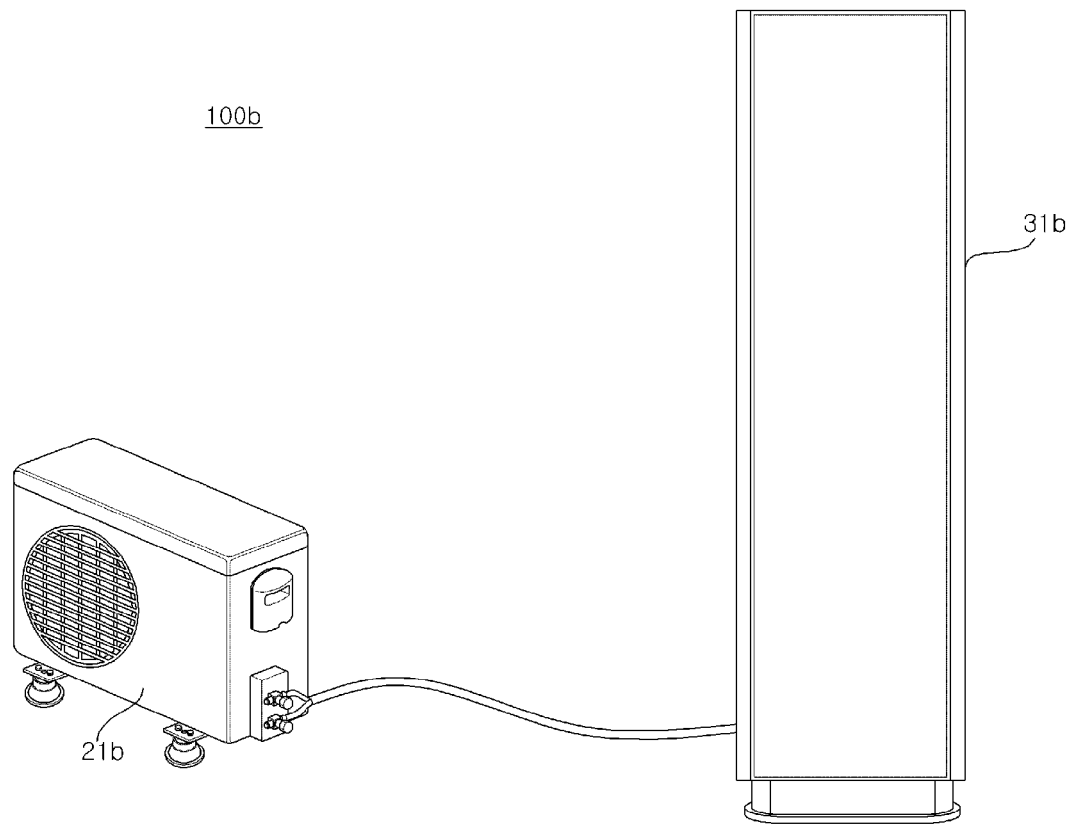
FIG. 17 is a view illustrating configuration of an air conditioner which is another exemplary electronic device according to an embodiment of the present invention.

FIG. 17 is a view illustrating configuration of an air conditioner which is another exemplary electronic device according to an embodiment of the present invention.

According to an embodiment, the air conditioner 100b may include an indoor unit 31b and an outdoor unit 21b connected to the indoor unit 31b, as shown in FIG. 17.

As the indoor unit 31b, any one of a standing indoor unit, a wall-mounted indoor unit and a ceiling-mounted indoor unit may be employed. In FIG. 17, the indoor unit 31b is a standing indoor unit.

The air conditioner 100b may further include at least one of a ventilator, an air cleaner, a humidifier and a heater, which may operate in connection with operations of the indoor unit and the outdoor unit.

The outdoor unit 21b includes a compressor (not shown) for compressing a refrigerant supplied thereto, an outdoor heat exchanger (not shown) causing heat exchange between the refrigerant and the outdoor air, an accumulator (not shown) for extracting a gaseous refrigerant from the supplied refrigerant and supplying the same to the compressor, and a 4-way valve (not shown) for selecting a flow path of the refrigerant according to the heating operation. The outdoor unit 21b further includes a plurality of sensors, a valve and an oil collector, which will not be described below.

The outdoor unit 21b operates the compressor and the outdoor heat exchanger provided to the outdoor unit 21b to compress the refrigerant or cause heat exchange according to the settings to supply the refrigerant to the indoor unit 31b. The outdoor unit 21b may be driven by a remote controller (not shown) or according to a request from the indoor unit 31b. As the cooling/heating capacity depends on the indoor unit, the number of operations of the outdoor unit and the number of operations of the compressor installed in the outdoor unit are changeable.

The outdoor unit 21b supplies the compressed refrigerant to the indoor unit 31b connected thereto.

The indoor unit 31b receives the refrigerant from the outdoor unit 21b and discharges cooled air to the indoor space. The indoor unit 31b includes an indoor heat exchanger (not shown), an indoor unit fan (not shown), an expansion valve (not shown) for expanding the supplied refrigerant, and multiple sensors (not shown).

The outdoor unit 21b and the indoor unit 31b are connected through a communication line to exchange data. The outdoor unit and the indoor unit may be connected to a remote control (not shown) by wire or wirelessly. Thereby, operations of the outdoor unit and the indoor unit may be controlled by the remote control (not shown).

The remote control (not shown) is connected to the indoor unit 31b to input a control command of the user to the indoor unit. The remote control may receive and display the status information about the indoor unit. The remote control may communicate with the indoor unit by wire or wirelessly.

Figure 18:
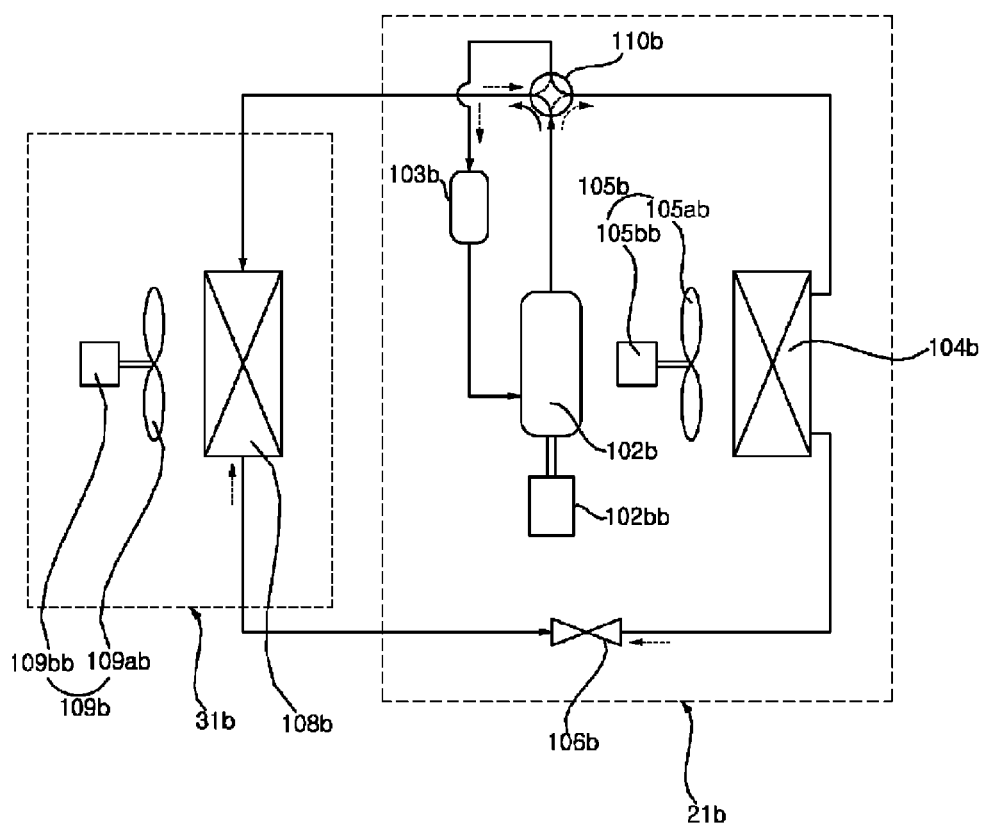
FIG. 18 is a schematic diagram illustrating the outdoor unit and the indoor unit of FIG. 17.

FIG. 18 is a schematic diagram illustrating the outdoor unit and the indoor unit of FIG. 17.

Referring to FIG. 18, the air conditioner 100b is broadly divided into the indoor unit 31b and the outdoor unit 21b.

The outdoor unit 21b includes a compressor 102b serving to compress the refrigerant, a compressor motor 102bb for driving the compressor, an outdoor heat exchanger 104b serving to dissipate heat from the compressed refrigerant, an outdoor air blower 105b including an outdoor fan 105ab disposed on one side of the outdoor heat exchanger 104b to support heat dissipation from the refrigerant and a motor 105bb for rotating the outdoor fan 105ab, an expansion mechanism 106b for expanding the condensed refrigerant, a cooling/heating switching valve 110b for switching between flow paths of the compressed refrigerant, and an accumulator 103b for temporarily storing the evaporated refrigerant, removing moisture and foreign substances from the stored refrigerant, and then supplying the refrigerant of a constant pressure to the accumulator 103b.

The indoor unit 31b includes an indoor heat exchanger 109b disposed in the indoor space to perform the cooling/heating functions and an indoor air blower 109b including an indoor fan 109ab disposed on one side of the indoor heat exchanger 109b to support heat dissipation from the refrigerant and a motor 109bb for rotating the indoor fan 109ab.

At least one indoor heat exchanger 109b may be installed. As the compressor 102b, at least one of an inverter compressor and a constant speed compressor may be employed.

The air conditioner 100b may be configured as an air cooler for cooling the indoor space or as a heat pump for cooling or heating the indoor space.

The compressor 102b in the outdoor unit 21b of FIG. 17 may be driven by a motor driving apparatus for driving a compressor motor such as the motor driving apparatus of FIG. 1.

Alternatively, the indoor fan 109ab or the outdoor fan 105ab may be driven by a motor driving apparatus for driving an indoor fan motor 109bb or an outdoor fan motor 150bb, such as the motor driving apparatus of FIG. 1.

Figure 19:
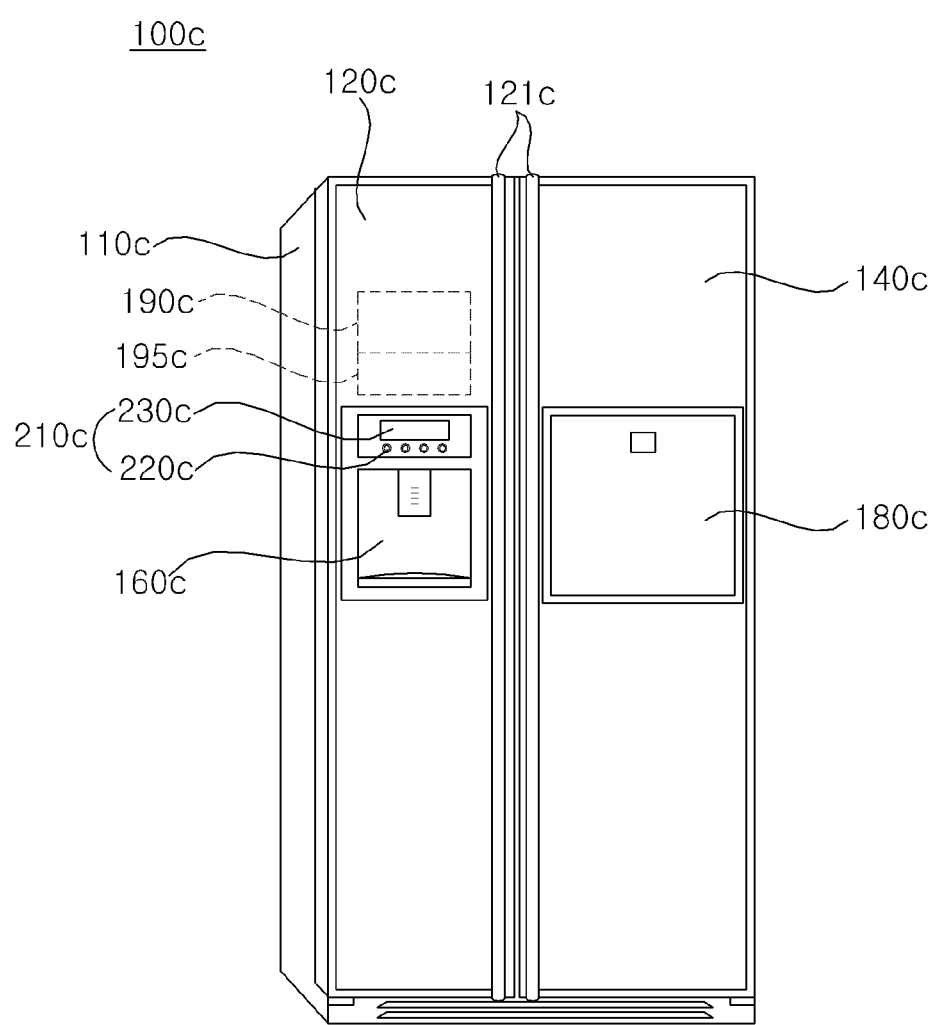
FIG. 19 is a perspective view illustrating a refrigerator which is another exemplary electronic device according to an embodiment of the present invention.

FIG. 19 is a perspective view illustrating a refrigerator which is another exemplary electronic device according to an embodiment of the present invention.

Referring to FIG. 19, the overall exterior of a refrigerator 100c is defined by a case 110c having an inner space partitioned into a freezer compartment and a cooling compartment, which are not shown, a freezer compartment door 120c for shielding the freezer compartment, and a cooling compartment door 140c for shielding the cooling compartment.

The front surfaces of the freezer compartment door 120c and the cooling compartment door 140c are provided with door handles 121c protruding forwards such that the user can easily grip the door handles 121c to rotate the freezer compartment door 120c and the cooling compartment door 140c.

The front surface of the cooling compartment door 140c may be further provided with a home bar 180c, which is a convenient means for allowing the user to take out a stored item such as a beverage without opening the cooling compartment door 140c.

The front surface of the freezer compartment door 120c may be further provided with a dispenser 160c, which is a convenient means for allowing the user to take out ice or drink water without opening the freezer compartment door 120c. A control panel 210c for controlling operation of the refrigerator 100c and displaying the operation status of the refrigerator 100c may be provided on the upper side of the dispenser 160c.

While the dispenser 160c is illustrated as being disposed on the front surface of the freezer compartment door 120c, embodiments of the present invention are not limited thereto. The dispenser 160c may be disposed on the front surface of the cooling compartment door 140c, for example.

Meanwhile, the inner upper portion of the freezer compartment (not shown) may be provided with an icemaker 190c for making ice out of the supplied water using cold air in the freezer compartment and an ice bank 195c installed inside the freezer compartment (not shown) to contain separated ice pieces made by the icemaker. Although not shown in the figure, an ice chute (not shown) for guiding fall of ice from the ice bank 195c into the dispenser 160c may be further provided.

The control panel 210c may include an input unit 220c comprising multiple buttons and a display unit 230c for displaying a control window and an operation status.

The display unit 230c displays a control window, an operation status, and information such as a temperature in the refrigerator. For example, the display unit 230c may display a service mode (ice cubes, water, chipped ice) of the dispenser, a set temperature of the freezer compartment, and a set temperature of the cooling compartment.

The display unit 230c may be implemented by employing, for example, a liquid crystal display (LCD), light emitting diodes (LEDs), and organic light emitting diodes (OLEDs). The display unit 230c may also be implemented by employing a touchscreen capable of performing the function of the input unit 220c.

The input unit 220c may be provided with multiple manipulation buttons. For example, the input unit 220c may include a dispenser setting button (not shown) for setting a service mode (ice cubes, water, chipped ice, etc.) of the dispenser, a freezer compartment temperature setting button (not shown) for setting the temperature of the freezer compartment, a cooling compartment temperature setting button (not shown) for setting the temperature of the cooling compartment. The input unit 220c may be implemented by a touchscreen capable of performing the function of the display unit 230c.

The refrigerator according to embodiments of the present invention is not limited to the illustrated double door type refrigerator. The refrigerator may be of any type of refrigerator including one door type, sliding door type, and curtain door type.

Figure 20:
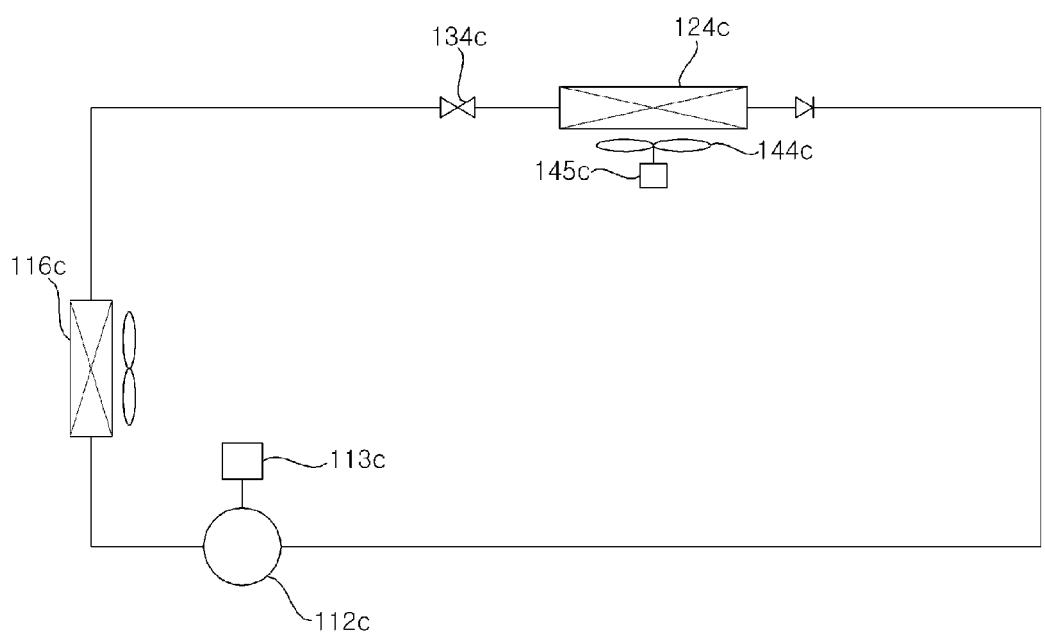
FIG. 20 is a diagram schematically illustrating configuration of the refrigerator of FIG. 19.

FIG. 20 is a diagram schematically illustrating configuration of the refrigerator of FIG. 19.

Referring to FIG. 20, the refrigerator 100c may include a compressor 112c, a condenser 116c for condensing a refrigerant compressed by the compressor 112c, a freezer compartment evaporator 124c disposed on the freezer compartment (not shown) to evaporate the condensed refrigerant supplied from the condenser 116c, and a freezer compartment expansion valve 134c for expanding the refrigerant supplied from the freezer compartment evaporator 124c.

While FIG. 20 illustrates that one evaporator is used, each of the cooling compartment and the freezer compartment may employ its own evaporator.

That is, the refrigerator 100c may further include a cooling compartment evaporator (not shown) disposed on the cooling compartment (not shown), a 3-way valve (not shown) for supplying the refrigerant condensed by the condenser 116c to the cooling compartment evaporator (not shown) or the freezer compartment evaporator 124c, and a cooling compartment expansion valve (not shown) for expanding the refrigerant supplied to the cooling compartment evaporator (not shown).

The refrigerator 100c may further include a liquid-gas separator (not shown) in which the refrigerant from the evaporator 124c is separated into liquid and gas.

The refrigerator 100c may further include a cooling compartment fan (not shown) and a freezer compartment fan 144c, which suction cold air arriving via the freezer compartment evaporator 124c and supply the same to the cooling compartment (not shown) and the freezer compartment (not shown).

The refrigerator 100c may further include a compressor drive unit 113c for driving the compressor 112c, a cooling compartment drive unit (not shown) for driving the cooling compartment fan (not shown), and a freezer compartment fan drive unit 145c for driving the freezer compartment fan 144c.

Referring to FIG. 20, the evaporator 124c is used for both the cooling compartment and the freezer compartment. In this case, a damper (not shown) may be installed between the cooling compartment and the freezer compartment, and the fan (not shown) may forcibly blow the air cooled by the evaporator to the freezer compartment and the cooling compartment.

The compressor 112c of FIG. 20 may be driven by a motor driving apparatus for driving the compressor motor, such as the motor driving apparatus of FIG. 1.

Alternatively, the cooling compartment fan (not shown) or the freezer compartment fan 144c may be driven by a motor driving apparatus for driving the cooling compartment fan motor (not shown) or the freezer compartment fan motor (not shown), such as the motor driving apparatus of FIG. 1.

The mobile terminal and the electronic device according to embodiments of the present invention are not limited to configurations and methods of the embodiments described above. Variations may be made to the embodiments described above by selectively combining all or some of the embodiments.

A method for operating a mobile terminal or an electronic device according to the embodiments of the present invention is implementable by code readable processor provided to the mobile terminal or the electronic device, on a recording medium readable by the processor. The recording medium readable by the processor includes all kinds of recording devices for storing data which can be read by the processor.

A mobile terminal according to an embodiment of the present invention includes a communication unit, a display, and a controller for performing a control operation to display an electronic device-related screen based on a user input, performing a control operation to display a diagnostic data screen when there is an input for a diagnosis mode with the electronic device-related screen displayed, and performing a control operation to display a detailed diagnostic data screen when there is an input for a detailed diagnosis mode. Thereby, diagnostic data or detailed diagnostic data about the electronic device may be easily displayed.

An electronic device according to an embodiment of the present invention includes a memory, a communication unit, and a controller. When an error occurs during operation of the electronic device, the controller performs a control operation to store, in the memory, diagnostic data containing error occurrence time information, and status information and operation at the error occurrence time. When the communication unit receives a request for diagnostic data, the controller performs a control operation to transmit the diagnostic data to the mobile terminal. When the communication unit receives a request for detailed diagnostic data, the controller performs a control operation to transmit the detailed diagnostic data to the mobile terminal. Thereby, the diagnostic data or the detailed diagnostic data may be easily transmitted to the mobile terminal.

Although the preferred embodiments of the present invention have been disclosed for illustrative purposes, those skilled in the art will appreciate that various modifications, additions and substitutions are possible, without departing from the scope and spirit of the invention as claimed in the accompanying claims.

What is claimed is:
1. An electronic device comprising:
    a drive unit including an inverter to drive a motor of the electronic device;
    a memory;
    a communication unit; and
    a controller to perform a control operation when an error occurs during operation of the electronic device, the controller to store, in the memory, diagnostic data containing error occurrence time information, operation information at a time of occurrence of the error, and status information, to perform a control operation to retrieve the diagnostic data from the memory when a request for the diagnostic data is received by the communication unit, to transmit the diagnostic data to a mobile terminal, and to perform a control operation to retrieve detailed diagnostic data stored in the memory when a request for the detailed diagnostic data is received by the communication unit, and to transmit the detailed diagnostic data to the mobile terminal,
    wherein the memory:
    temporarily stores periodic data including the operation information and the status information,
    when an error occurs, stores instantaneous data including operation information at the time of error occurrence,
    stores post-occurrence data including operation information or status information after a predetermined time from the time of error occurrence,
    wherein the detailed diagnostic data includes a target frequency of the inverter, and a present frequency, an input voltage, an input power frequency, a target DC-link voltage, a present DC-link voltage, phase current flowing in the motor.

2. The electronic device according to claim 1, wherein the controller performs a control operation to temporarily store operation information and status information in the memory periodically, and performs a control operation to store final operation information and final status information of the operation information, and the status information in the memory.

3. The electronic device according to claim 2, wherein, when the error occurs, the controller performs a control operation to store the operation information at the time of occurrence of the error in the memory, and
    the controller performs a control operation to store, in the memory, operation information or status information given after a predetermined time from the time of occurrence of the error.

4. The electronic device according to claim 3, wherein data amount of the final operation information and the final status information are larger than a data amount of the operation information at the time of occurrence of the error or a data amount of the operation information or the status information given after the predetermined time from the time of occurrence of the error.

5. The electronic device according to claim 1, wherein, when the controller receives request for the diagnostic data from the mobile terminal at least a predetermined number of times, the controller performs a control operation to transmit an acknowledgment message to the mobile terminal.

6. The electronic device according to claim 1, wherein the mobile terminal comprising:
    a second communication unit;
    a second display; and
    a second controller to perform a control operation to display on the second display a screen related to the electronic device, to perform a control operation to request for diagnostic data based on an input for a diagnosis mode provided with the screen related to the electronic device, to display on the second display a screen of the diagnostic data, and to perform a control operation to request for detailed diagnostic data based on an input for a detailed diagnosis mode, and to display on the second display a screen of the detailed diagnostic data.

7. The electronic device according to claim 6, wherein the screen of the detailed diagnostic data on the second display contains error code information, detailed diagnostic data for each error time, and error history information,
    wherein, when the second controller receives a selection on error code information, the second controller performs a control operation to highlight and display items corresponding to the selected error code information among a plurality of items in the screen of the detailed diagnostic data on the second display.

8. The electronic device according to claim 6, wherein, when the second controller receives an input for saving the screen of the detailed diagnostic data, the second controller performs a control operation to display on the second display a data save screen for setting a filename and a location to save a file.

9. The electronic device according to claim 6, wherein, when the second controller receives a selection of an diagnosis mode item in the screen related to the electronic device on the second display, the second controller performs a control operation to transmit a request for diagnostic data to the electronic device, and performs a control operation to display the screen of the diagnostic data based on the diagnostic data received from the electronic device on the second display.

* * * * *